US012800493B2

(12) United States Patent
Moloney et al.

(10) Patent No.: US 12,800,493 B2
(45) Date of Patent: Nov. 17, 2026

(54) FLUORESCENT NANOPARTICLES FOR OILFIELD AND OTHER CHEMICAL PRODUCT INJECTION ASSURANCE, MONITORING AND TRACING

(71) Applicant: ChampionX LLC, Sugar Land, TX (US)

(72) Inventors: Jeremy Moloney, Katy, TX (US); Christine Kerr, Houston, TX (US); Christopher Louis Durnell, Sugar Land, TX (US)

(73) Assignee: ChampionX LLC, Sugar Land, TX (US)

( * ) Notice: Subject to any disclaimer, the term of this patent is extended or adjusted under 35 U.S.C. 154(b) by 38 days.

(21) Appl. No.: 18/673,561

(22) Filed: May 24, 2024

(65) Prior Publication Data

US 2024/0393242 A1 Nov. 28, 2024

Related U.S. Application Data

(60) Provisional application No. 63/503,976, filed on May 24, 2023.

(51) Int. Cl.
*G01N 21/64* (2006.01)
*C09K 11/65* (2006.01)

(52) U.S. Cl.
CPC .............. *G01N 21/64* (2013.01); *C09K 11/65* (2013.01); *G01N 2201/06193* (2013.01)

(58) Field of Classification Search
CPC ................. G01N 21/643; G01N 33/24; G01N 2021/7786; G01N 21/59; G01N 21/78; G01N 21/80; G01N 2201/0691; G01N 33/1826; G01N 2021/6439; G01N 21/64; G01N 33/241; G01N 2021/1746; G01N 2021/6417; G01N 2021/8557;
(Continued)

(56) References Cited

U.S. PATENT DOCUMENTS 8,877,505 B2 * 11/2014 May ..................... C09K 11/025 977/774
10,119,072 B2 11/2018 Kanj et al.
(Continued)

FOREIGN PATENT DOCUMENTS

BR 112020023062 A2 * 2/2021 .............. B01J 13/02
BR 112017023203 B1 * 5/2023
(Continued)

OTHER PUBLICATIONS

Brichart et al., "The Use of Fluorescent Tracers for Inhibitor Concentration Monitoring Useful for Scale Inhibitor Squeeze Evaluation," International Petroleum Technology Conference, 2014, 8 pages.
(Continued)

*Primary Examiner* — Michael P Stafira
(74) *Attorney, Agent, or Firm* — McKee, Voorhees & Sease, PLC

(57) ABSTRACT

Compositions and methods for measuring the concentration of chemical species in oilfield environments, water processing and treatment, natural gas processing plants and pipelines, and other applications and other applications using fluorescent nanoparticles that are easily detectable while also being inert within the microenvironment are disclosed.

6 Claims, 10 Drawing Sheets

(58) Field of Classification Search

CPC ......... G01N 2030/025; G01N 21/6428; G01N 21/85; G01N 30/7206; G01N 33/1813; G01N 15/0806; G01N 21/6489; G01N 2201/06193; G01N 33/2823; G01N 27/122; G01N 27/126; G01N 27/128; G01N 33/18; G01N 33/2888; G01N 1/38; G01N 15/08; G01N 15/082; G01N 15/088; G01N 2015/0846; G01N 2021/0321; G01N 2021/0389; G01N 2021/3595; G01N 2021/8416; G01N 21/0303; G01N 21/272; G01N 21/31; G01N 21/3577; G01N 21/4133; G01N 21/552; G01N 21/6486; G01N 2203/0019; G01N 2203/04; G01N 27/002; G01N 3/02; G01N 3/08; G01N 3/42; G01N 30/88; G01N 33/28; G01N 33/2835; G01N 33/2841; C09K 2208/10; C09K 8/92; C09K 2208/32; C09K 8/03; C09K 2208/26; C09K 2208/20; C09K 8/528; C09K 8/70; C09K 8/52; C09K 8/805; C09K 8/42; C09K 8/524; C09K 8/80; C09K 8/58; C09K 8/72; C09K 8/665; C09K 8/536; C09K 8/60; C09K 2208/08; C09K 8/588; C09K 8/62; C09K 2208/12; C09K 8/50; C09K 8/605; C09K 8/035; C09K 8/64; C09K 8/66; C09K 2208/22; C09K 2208/24; C09K 8/602; C09K 8/487; C09K 11/06; C09K 8/594; C09K 8/685; C09K 8/68; C09K 8/74; C09K 2208/28; C09K 11/02; C09K 11/025; C09K 11/65; C09K 2208/30; C09K 8/516; C09K 8/54; C09K 8/703; C09K 8/845; C09K 8/24; C09K 8/584; C09K 8/88; C09K 8/467; C09K 8/601; C09K 8/82; C09K 8/94; C09K 11/684; C09K 11/7773; C09K 2211/1014; C09K 2211/1018; C09K 2211/145; C09K 2211/182; C09K 8/16; C09K 8/725; C09K 8/887; C09K 11/883; C09K 2211/10; C09K 2211/1011; C09K 3/1445; C09K 8/032; C09K 8/592; C09K 8/706

See application file for complete search history.

(56) References Cited

U.S. PATENT DOCUMENTS

| | | | | |
|---|---|---|---|---|
| 10,125,601 | B2 | 11/2018 | Rose et al. | |
| 10,233,273 | B2 | 3/2019 | Kundu et al. | |
| 10,954,437 | B2 | 3/2021 | Moloney et al. | |
| 11,130,685 | B2 | 9/2021 | Moloney et al. | |
| 2010/0239620 | A1* | 9/2010 | Butler | C09D 11/037 106/31.13 |
| 2012/0032093 | A1* | 2/2012 | Moore | E21B 37/06 526/263 |
| 2015/0129793 | A1* | 5/2015 | Ruan | C09K 11/025 252/301.36 |
| 2016/0168952 | A1 | 6/2016 | Qu et al. | |
| 2017/0096600 | A1 | 4/2017 | Tour et al. | |
| 2017/0355628 | A1* | 12/2017 | Moloney | C23F 11/149 |
| 2020/0166458 | A1 | 5/2020 | Abla et al. | |
| 2021/0163818 | A1 | 6/2021 | Moloney et al. | |
| 2021/0181108 | A1 | 6/2021 | Burns et al. | |
| 2021/0246365 | A1 | 8/2021 | Borrell et al. | |
| 2021/0371726 | A1* | 12/2021 | Kanj | E21B 43/162 |
| 2022/0024788 | A1* | 1/2022 | Moloney | C02F 1/68 |
| 2023/0042309 | A1 | 2/2023 | Zenasni et al. | |
| 2023/0144199 | A1* | 5/2023 | Wang | C08F 12/08 166/250.12 |
| 2024/0009309 | A1 | 1/2024 | Comrie et al. | |
| 2024/0060417 | A1 | 2/2024 | Wang | |
| 2024/0084459 | A1 | 3/2024 | Garcia, III et al. | |
| 2026/0008801 | A1* | 1/2026 | Ranoux | C07C 235/06 |

FOREIGN PATENT DOCUMENTS

| | | | | | |
|---|---|---|---|---|---|
| CN | 1284896 | A | * | 2/2001 | B01J 20/28078 |
| CN | 101726475 | A | * | 6/2010 | |
| CN | 111591976 | A | | 8/2020 | |
| CN | 111591977 | A | | 8/2020 | |
| CN | 111285351 | B | | 10/2021 | |
| CN | 114751398 | A | | 7/2022 | |
| CN | 111044495 | B | | 9/2022 | |
| CN | 115432693 | A | | 12/2022 | |
| JP | H10500058 | A | * | 1/1998 | B01J 39/26 |
| WO | WO-2015174996 | A1 | * | 11/2015 | C09K 8/524 |
| WO | WO-2016025051 | A2 | * | 2/2016 | H10H 20/822 |
| WO | WO-2021135996 | A1 | * | 7/2021 | E21B 47/11 |
| WO | WO-2023242424 | A1 | * | 12/2023 | C07C 235/06 |

OTHER PUBLICATIONS

Kahn et al., "Hydrophobic, partially hydrophobic, and hydrophilic ZnO@SiO2 nanoparticles as fluorescent partitioning tracers for oil sensing applications," Journal of Molecular Liquids, Aug. 15, 2022, vol. 360, No. 119505, 3 pages.

Wolfbeis, O., "An overview of nanoparticles commonly used in fluorescent bioimaging," Chemical Society Reviews, 2015, vol. 44, pp. 4743-4768.

International Search Report and Written Opinion in PCT/US2024/030915, mailed Nov. 26, 2024, 13 pages.

* cited by examiner

FLUORESCENT NANOPARTICLES FOR OILFIELD AND OTHER CHEMICAL PRODUCT INJECTION ASSURANCE, MONITORING AND TRACING

CROSS-REFERENCE TO RELATED APPLICATIONS

This application claims priority under 35 U.S.C. § 119 to provisional patent application U.S. Ser. No. 63/503,976, filed May 24, 2023. The provisional patent application is herein incorporated by reference in its entirety.

TECHNICAL FIELD

The disclosure relates to compositions and methods for measuring the concentration of chemical species in oilfield environments, water processing and treatment, natural gas processing plants and pipelines, and other applications using fluorescent nanoparticles that are easily detectable while also being inert within the microenvironment.

BACKGROUND

Various laboratory tests under simulated field conditions are conventionally conducted to identify dosing of oilfield chemical dosage, such as corrosion inhibitors, to reach the operator's various performance requirements before field deployment. For example, when used in the field, corrosion inhibitors are added to a pipe carrying an injectate or a produced water at a rate to initially target a laboratory determined concentration of corrosion inhibitor. Ideally, because of differences between the laboratory and field environments, the corrosion inhibitor addition rate is further optimized in the field based on corrosion monitoring, which is assumed to be representative of the system. The corrosion monitoring is further complemented with corrosion inhibitor residual analysis, that is, measurement of residual corrosion inhibitor concentration at the end of a pipe. However, in systems lacking means of corrosion monitoring, operators often rely solely on residual monitoring—particularly in the case of produced water—to ensure that the corrosion inhibitor concentration is within a targeted range.

Residual analysis of corrosion inhibitor concentration in produced water sources is conventionally conducted in the field using colorimetric techniques. Such field methods are advantageous in that results can be rapidly gained, and appropriate corrosion inhibitor dose adjustment can be made fairly quickly. However, these approaches are unable to independently identify and quantify individual active components of corrosion inhibitors due to both the presence of more than one corrosion inhibitor, and/or the presence of one or more additives, and/or the presence of residual hydrocarbon products entrained in the produced water. For greater accuracy and speciation, a sample can be sent to the laboratory for more advanced techniques such as liquid chromatography-mass spectrometry (LC-MS) analysis. However, LC-MS analysis takes much longer than simple colorimetric techniques employed in e.g. field monitoring.

Thus, improved residual analysis techniques for corrosion inhibitors and other oilfield chemicals are needed. Specifically, there is a need in the industry to provide compositions and methods for rapid chemical component concentration measurement in injectate and produced water sources. There is a need for such compositions and methods to provide useful on-demand and in the field during subterranean hydrocarbon recovery processes. There is a need for such compositions and methods to provide rapid results that enable such measurements to be made in real time. There is a need for such compositions and methods to provide resolution of one or more distinct composition species from other corrosion inhibitor species, from other additives present in the water source (or other fluid), and from hydrocarbon products entrained in the water.

The use of fluorescent materials for tagging and tracing treatment chemicals in oilfields and industrial water sources has been explored. The use of fluorescent tracers, such as a tracer chemically bonded to a chemical ("tagged" chemical), allows for the efficient treatment in oilfield applications and of industrial water sources by providing a means to measure the amount of a treatment chemical in real time. A treated fluid having the tagged chemical dispersed or dissolved can be irradiated with a wavelength of light known to cause a fluorescent emission of the fluorescent tracer. The known fluorescence emission wavelength of the tracer is targeted for measurement. Typically, such measurements are made at one or more points downstream from the point of addition of the tagged chemical. Quantification of chemicals allows the operator to more efficiently treat the fluid by avoiding under-dosing or overdosing of chemicals.

In various applications of use background fluorescence regions of fluids, such as industrial water sources, is about 550 nm or less, overlapping with the fluorescence emission region of many conventional fluorophores. It is very difficult to find an inert (chemically unreactive) fluorophore that overcomes the interference from high fluorescent background and light scattering due to the presence of emulsified hydrocarbons, charged coagulants, dissolved salts and other water soluble or dispersible compounds, flocculants, microbes, and other contaminants present in fluids, including industrial water sources and oilfield fluids. Some have used techniques to modify luminescence behavior within a fluid, such as adding reagents to either suppress or increase the luminescence of the organic species in a fluid. However this is not desirable as it adds additional steps, cost, complexity, and opportunity for error. Accordingly, there is a need for use of fluorescent materials that do not require modification with additives to vary luminescence behavior. There is a need for a fluorophore that is useful for tracing treatment chemicals in fluids including oilfield environments and industrial water sources. There is a need for fluorophores and treatment compositions that overcome the obstacles presented by fluids having background interference making it difficult to fluorescently trace treatment chemicals.

Nanoparticles, including quantum dots, have also been used as fluorescent tracers through covalent bonding with chemicals. In addition, such nanoparticles can also be functionalized to have desired bonding characteristics. However, this technology is costly, and presents manufacturing challenges in addition to compatibility challenges with various chemistries in need of monitoring and tracing.

It is therefore an object of this disclosure to provide compositions providing fluorophores, namely fluorescent nanoparticles with a fluorescence emission wavelength range that avoids background interference with monitoring and tracing of chemicals in industrial water sources and oilfield fluids.

It is a further object of the disclosure to provide fluorescent nanoparticle compositions that are compatible with oilfield environments and chemistries along with other applications and chemistries.

It is another object of this disclosure to formulate using fluorescent nanoparticles that are not tagging or covalently bonding with oilfield chemicals. In such objects a more cost-effective and less intensive manufacturing process for providing fluorescent nanoparticles as a fluorophore is desired.

Other objects, embodiments and advantages of this disclosure will be apparent to one skilled in the art in view of the following disclosure, the drawings, and the appended claims.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is an object, feature, and/or advantage of the present disclosure to provide a fluorescent treatment composition comprising: from about 0.0001-5 wt % of a fluorescent nanoparticle comprising at least one of graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores; and a treatment compound comprising an oilfield chemical, water treatment chemical, geothermal chemical, chemicals in gas, liquid and/or supercritical fluids lines and systems, or combinations thereof, wherein the composition luminesces at a determined wavelength between about 300 nm to about 1,000 nm when excited by light having a wavelength determined by the fluorescent nanoparticle.

It is still yet a further object, feature, and/or advantage of the present disclosure to provide method of measuring a concentration of a treatment compound in a fluid comprising: adding a fluorescent treatment composition to the fluid to form a treated fluid; irradiating the treated fluid with a source of light having a selected first range of wavelengths; measuring luminescent emission of the treated fluid at a selected second range of wavelengths, and wherein the luminescent emission is proportional to the concentration of the treatment compound in the treated fluid.

It is still yet a further object, feature, and/or advantage of the present disclosure to provide methods of measuring a concentration of a treatment compound in a fluid comprising: adding a fluorescent nanoparticle and a treatment compound to the fluid to form a treated fluid; irradiating the treated fluid with a source of light having a selected first range of wavelengths; and measuring luminescent emission of the treated fluid at a selected second range of wavelengths, wherein the measuring is carried out substantially contemporaneously with the irradiating, wherein the fluorescent nanoparticle comprises at least one of graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores; wherein the treatment compound comprises an oilfield chemical, water treatment chemical, geothermal chemical, chemicals in gas, liquid and/or supercritical fluids lines and systems, or combinations thereof; and wherein the steps of adding the fluorescent nanoparticle and the treatment compound can be combined in a single step or separately added to the fluid.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
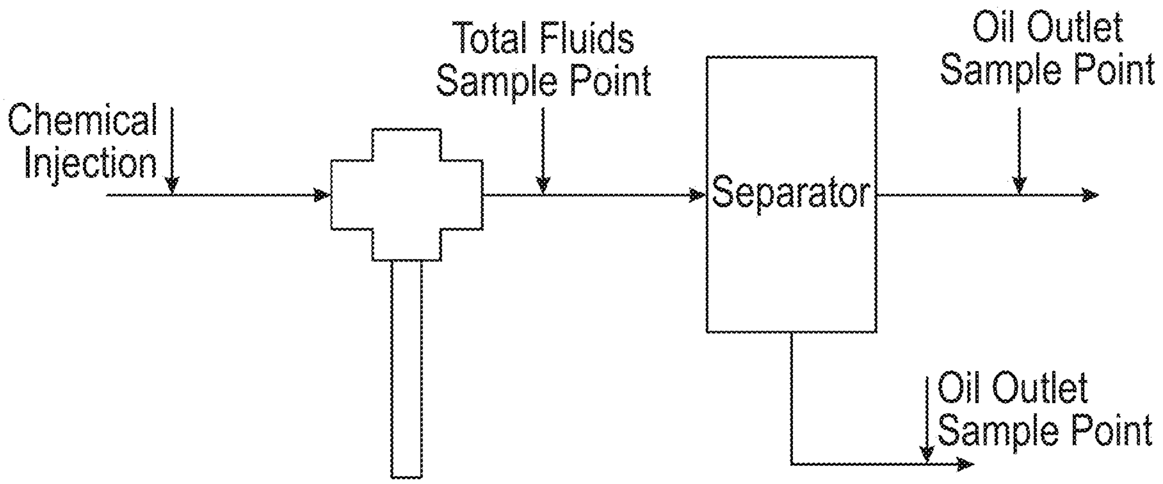
FIG. 1 shows a flow diagram of a field system where tests were conducted as described in Example 1 and represents a non-limiting embodiment of the methods as described herein.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented as exemplary illustration of the invention. An artisan of ordinary skill in the art need not view, within isolated figure(s), the near infinite number of distinct permutations of features described in the following detailed description to facilitate an understanding of the present invention.

DETAILED DESCRIPTION

It is to be understood that all terminology used herein is for the purpose of describing particular embodiments only and is not intended to be limiting in any manner or scope. For example, as used in this specification and the appended claims, the singular forms “a,” “an” and “the” can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present disclosure pertain.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, concentration, mass, volume, time, molecular weight, temperature, pH, molar ratios, and the like. Further, the term can encompass amounts that differ due to procedures used in the real world and inadvertent error and/or variation that is likely through differences in the manufacture, source, measurement, and the like. The term "about" also encompasses these variations. Whether or not modified by the term "about," the claims include equivalents to the quantities.

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

As used herein, the term "exemplary" refers to an example, an instance, or an illustration, and does not indicate a most preferred embodiment unless otherwise stated.

As used herein, the term "fluorophore" refers to a compound that re-emits lights upon light excitation. Fluorophores absorb light energy of specific wavelengths and re-emit light at a longer wavelength. Fluorophores are commonly defined according to the wavelength of excitation or maximum absorption and the wavelength of emission.

As used herein, the term "fluorescent nanoparticle" refers to the types of fluorophores for use according to the described compositions and methods, including for example quantum dots, including graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores.

The term "generally" encompasses both "about" and "substantially."

As used herein, the term "hydrocarbon" means liquid or solid compounds composed substantially of carbon and hydrogen and including one or more of linear, branched, or cyclic alkanes, alkenes, or alkynes; aromatic and alkaromatic compounds, and polymerized products thereof. The term hydrocarbon is used herein to indicate petroleum products entrained in a water source or capable of being entrained. In some embodiments hydrocarbon is entrained in a water source after bulk separation of the aqueous and hydrocarbon phases recovered in one or more subterranean hydrocarbon recovery processes. Such processes include but are not limited to hydraulic fracturing and tertiary oil recovery. In some embodiments hydrocarbon is entrained in a water source after one or more industrial processes wherein the water is employed as a cooling agent. Thus, for example, recycled water employed in an ethylene cracker system as a coolant for pyrolyzed hydrocarbon sources is contacted with hydrocarbon byproducts of the pyrolysis and some of these byproducts become entrained in the water source. Other examples of hydrocarbon becoming entrained in one or more water sources are easily envisioned by one of skill. As used herein, the term "entrained" means dissolved, dispersed, or emulsified.

As used herein, the term "injectate" means water plus any solids or liquids dispersed therein that is injected into a subterranean formation for the purpose of inducing hydrocarbon recovery therefrom. Injectates optionally include salts, polymers, surfactants, scale inhibitors, stabilizers, metal chelating agents, corrosion inhibitors, paraffin inhibitors, and other additives as determined by the operator in a subterranean hydrocarbon recovery process. In some embodiments, an injectate includes or is sea water, brine, hard water, or wastewater such as municipal waste water or gray water.

As used herein, the term "optional" or "optionally" means that the subsequently described event or circumstance may but need not occur, and that the description includes instances where the event or circumstance occurs and instances in which it does not.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but not limited to isotactic, syndiotactic and random symmetries, and combinations thereof. Furthermore, unless otherwise specifically limited, the term "polymer" shall include all possible geometrical configurations of the molecule.

As used herein, the term "produced water" means water that flows back from a subterranean reservoir. In some embodiments the produced water is collected after bulk separation of water and hydrocarbon obtained in a hydrocarbon recovery process including, but not limited to hydraulic fracturing and tertiary oil recovery. In such embodiments, the produced water includes between 0.001 wt-% and 99 wt-% hydrocarbon products entrained therein and one or more of injectate, connate (native water present in the subterranean formation along with the hydrocarbon), brackish water, and sea water. In other embodiments, "produced water" means water that flows back from a subterranean mining operation.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

As used herein, the terms "spectrometry" and "spectroscopy" means the process of analyzing the interaction between a sample of matter and electromagnetic radiation to determine one or more physical properties of the sample of matter. Forms of electromagnetic radiation used include but are not limited to one or more microwave, tera wave, infrared, near infrared, visible, ultraviolet, x-ray, radiation. The analysis includes measurements of one or more of the radiation's absorption, emission, fluorescence, colorimetric, color changes, reflection, scattering, impedance, refraction, and resonance by the sample of matter.

The term "substantially" refers to a great or significant extent. "Substantially" can thus refer to a plurality, majority, and/or a supermajority of said quantifiable variable, given proper context.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "surfactant" or "surface active agent" refers to an organic chemical that when added to a liquid changes the properties of that liquid at a surface.

As used herein, the term "treat" "treating" "treatment" or "treatment method", further referring to treatment of a fluid. Exemplary but nonlimiting examples of treatments include anti-corrosion treatments to passivate metal surfaces from corrodents, emulsion breaking treatments (i.e. demulsifiers) to cause liquid-liquid phase separation of a targeted material, anti-scale treatments to prevent deposition of calcium scale on surfaces, antifreeze treatments to prevent solidification of or to prevent phase separation, paraffin inhibition treatments to prevent deposition of waxy petroleum-based solids on surfaces, flocculation/coagulation treatments to remove solid impurities by precipitation, disinfection/sterilization treatments to neutralize or reduce microbial agents present in a treated fluid, purification treatments to remove various targeted materials from a treated fluid, polymerization inhibition treatments to reduce or prevent polymerization of hydrocarbon impurities present in a treated fluid, and the like.

As used herein, the term "treatment compound" refers to a compound added to one or more fluids (including gas and/or liquids) to treat a targeted material or combined with a fluorescent nanoparticle to form a fluorescent treatment composition. Exemplary fluids can include oil, water, gas, and/or supercritical fluids, such as found in oilfield applications, water treatment, geothermal applications, liquid or supercritical carbon dioxide lines and systems, liquid hydrogen transportation, liquid ammonia, and the like. Treatment compounds can include for example an oilfield chemical, water treatment chemical, geothermal chemical, chemicals in gas, liquid and/or supercritical fluids lines and systems, or combinations thereof. Examples include corrosion inhibitors, biocides, fungicides, scale inhibitors, hydrate inhibitors, paraffin inhibitors, asphaltene inhibitors, drag reducing agents, stabilizers, demulsifiers, hydrotropes, emulsion breakers, antifouling compounds, coagulants, flocculants, chelating agents, surfactants, oxygen scavengers, rheology control agents, surfactants, defoamers, foam inhibitors, dispersants, sulfide inhibitors, and the like. Various other treatment compounds can be employed and utilize the compositions and methods described herein.

As used herein, the term "water source" means water comprising the fluorescent treatment composition. Examples of water sources include injectates, industrial water treatment sources, or a produced water.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Fluorescent Nanoparticles

The compositions include a fluorophore that is a fluorescent nanoparticle in a composition with a treatment compound (e.g. oilfield chemical(s)). The compositions are in a solution or a stable suspension with the treatment compound in the fluorescent treatment composition or the treated fluid. The fluorescent nanoparticle and treatment compound are distinct from molecular fluorophores, labels and/or probes. In addition the fluorescent nanoparticle and treatment compound are not covalently bonded, connected as a ligand, or functionalized for covalent bonding and/or ligand-providing compositions that obviate the need for complex and expensive manufacturing and introduce fewer compatibility concerns. In embodiments the fluorescent nanoparticle does not include hydrophilic ligands and/or silica shells.

Nanoparticles are particles that have at least one dimension less than about 1000 nm. The nanoparticles selected for amine functionalization for improved thermal and brine stability have at least one dimension ranging from about 1-1000 nm. In some embodiments, the nanoparticles range from 1-500 nm; 1-400 nm; 1-250 nm; 1-100 nm; 1-50 nm; 200-500 nm; 200-400 nm; or 300-400 nm. In some embodiments a nanoparticle can have one of its dimensions larger than 1000 nm while another dimension is less than about 1000 nm and therefore it is considered a nanoparticle. In some embodiments, the size of a nanoparticle refers to the diameter or approximate diameter of a nanoparticle. For a population of nanoparticles, this can also be referred to as a Z-average particle size, which can be measured according to routine protocols known to one skilled in the art. In some embodiments, the size is measured by dynamic light scattering (DLS) (Z-average). In some embodiments, the size is measured by Transmission Electron Microscopy (TEM).

In some embodiments, the nanoparticles average particle size ranges from 1-500 nm; 1-400 nm; 1-250 nm; 1-100 nm; 1-50 nm; 200-500 nm; 200-400 nm; or 300-400 nm.

The nanoparticles can assume a variety of geometries, such as spheres, hollow shells, rods, plates, ribbons, prisms, stars, and combinations thereof. All geometries of nanoparticles can be employed as described herein.

In embodiments, the fluorescence emission wavelength of the fluorescent nanoparticle does not overlap with the background fluorescence emission wavelength of one or more materials entrained in the treated fluid. The fluorescent nanoparticles produce fluorescence at excitation wavelengths (i.e. $\lambda_{max}$), emission wavelengths, or both that are substantially non-overlapping with characteristic $\lambda_{max}$ or emission wavelengths of many materials present in treated fluid, thereby enabling monitoring and tracing of fluorescent nanoparticles concentration within a treated fluid in real time and without interference from extraneous fluorescence and thereby correlating the concentration of a treatment compound (e.g. oilfield chemical(s)). Beneficially, the fluorescent nanoparticles enable the monitoring of concentration of the treatment compound in the treated fluid in real time.

In other embodiments, fluorescent nanoparticles produce fluorescence at excitation wavelengths, emission wavelengths, or both with an amount of overlap between the emission wavelengths of one or more residual hydrocarbon products and the emissions wavelengths of the fluorescent nanoparticle, because in embodiments the fluorescence spectra of hydrocarbon mixtures are very broad, and/or because of compositional variation in the hydrocarbon mixtures present in various produced waters. In embodiments where such an overlap in emissions spectra exists, background subtraction, use of a correction factor, or both is introduced to provide suitable correction to measured emission wavelengths.

Fluorescent nanoparticles can include quantum dots, including graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores.

The fluorescent nanoparticles can have a molecular weight in certain preferred embodiments from about 550 Daltons to about 50 million Daltons, or from about 10,000 Daltons to about 1,000,000 Daltons, from about 1,000 Daltons to about 50 million Daltons, from about 10,000 Daltons to about 50 million Daltons, from about 100,000 Daltons to about 50 million Daltons, from about 550 Daltons to about 10,000,000 Daltons, from about 1,000 Daltons to about 10,000,000 Daltons, from about 10,000 Daltons to about 10,000,000 Daltons, from about 100,000 Daltons to about 10,000,000 Daltons, from about 1,000,000 Daltons to about 10,000,000 Daltons, from about 550 Daltons to about 1,000,000 Daltons, from about 1,000 Daltons to about 1,000,000 Daltons, from about 10,000 Daltons to about 1,000,000 Daltons, from about 100,000 Daltons to about 1,000,000 Daltons, from about 1,000 Daltons to about 100,000 Daltons, from about 10,000 Daltons to about 100,000 Daltons, from about 550 Daltons to about 50,000 Daltons, from about 1,000 Daltons to about 50,000 Daltons, or from about 10,000 Daltons to about 50,000 Daltons.

Exemplary fluorescent nanoparticles include quantum dots are nanometer-scale particles where excitons are confined in all three spatial dimensions. Quantum dots include graphene quantum dots (GQD) which are graphene particulate having a particle size small enough to cause exciton confinement and a quantum size effect, e.g. particle size of about 1 nm to 20 nm in a direction. Graphene particulates are characterized as substantially two-dimensional crystalline structures. Due to the fact that all graphene fragments exhibit quantum confinement effects, GQD have a non-zero bandgap and luminesce upon excitation. The spectroscopic properties of GOD vary depending on the size of the GQD.

In some embodiments the quantum dots do not include crystal quantum dots.

Exemplary GQD useful in embodiments of the compositions and methods include those having an average particle size of about 1 nm to 20 nm, or about 2 nm to 20 nm, or about 3 nm to 20 nm, or about 4 nm to 20 nm, or about 1 nm to 18 nm, or about 1 nm to 16 nm, or about 1 nm to 14 nm, or about 1 nm to 12 nm, or about 1 nm to 10 nm, or about 1 nm to 8 nm, or about 1 nm to 6 nm, or about 1 nm to 4 nm, or about 2 nm to 10 nm, or about 2 nm to 8 nm, or about 2 nm to 6 nm, or about 2 nm to 5 nm, or about 2 nm to 4 nm, or about 3 nm to 5 nm, wherein "particle size" refers to an average edge-to-edge distance of the substantially two-dimensional GQD, further as measured using Dynamic Light Scattering (DLS), Transmission electron microscopy (TEM) or ellipsometry. While GQD are often characterized as a single thickness of a graphene sheet, in fact in some embodiments and depending on the preparatory method used the GQD can be up to about 5 graphene layers thick. Results obtained from X-ray diffraction, Raman spectroscopy, and high resolution transmission electron microscopy demonstrate the GQD have a crystalline structure similar to that of graphene. The shape of most GQD is circular or elliptical, but triangular, quadrate and hexagonal GQD are known as well and are also useful in various embodiments as fluorophores.

The GQD can have a molecular weight in certain preferred embodiments from about 550 Daltons to about 50 million Daltons, or from about 10,000 Daltons to about 1,000,000 Daltons, from about 1,000 Daltons to about 50 million Daltons, from about 10,000 Daltons to about 50 million Daltons, from about 100,000 Daltons to about 50 million Daltons, from about 550 Daltons to about 10,000,000 Daltons, from about 1,000 Daltons to about 10,000,000 Daltons, from about 10,000 Daltons to about 10,000,000 Daltons, from about 100,000 Daltons to about 10,000,000 Daltons, from about 1,000,000 Daltons to about 10,000,000 Daltons, from about 550 Daltons to about 1,000,000 Daltons, from about 1,000 Daltons to about 1,000,000 Daltons, from about 10,000 Daltons to about 1,000,000 Daltons, from about 100,000 Daltons to about 1,000,000 Daltons, from about 1,000 Daltons to about 100,000 Daltons, from about 10,000 Daltons to about 100,000 Daltons, from about 550 Daltons to about 50,000 Daltons, from about 1,000 Daltons to about 50,000 Daltons, or from about 10,000 Daltons to about 50,000 Daltons.

The GQD useful in the compositions and methods can be made by either a "top down" or "bottom up" approach. Top-down methods involve the decomposition and exfoliation of inexpensive, readily available bulk graphene-based materials, most commonly graphite, but require harsh conditions and often further require multiple steps involving concentrated acids, strong oxidizing agents, and high temperatures. A commonly employed top-down synthesis is called the Hummers method and involves exfoliation of graphite nanoparticles to form GQD. Bottom-up methods involve synthesis from polycyclic aromatic compounds or other molecules with aromatic structures such as fullerenes. Although complex, these methods allow for superior control of the properties and morphology of the final product compared to the top-down methods. Various techniques to form GQD, including functionalized GQD are known, such as discussed in Bacon, M. et al., *Part. Part. Syst. Charact.* 2014, 31, 415-428. Accordingly to embodiments, the fluorescent nanoparticles are not covalently bonded to the treatment compound (e.g. oilfield chemicals such as corrosion inhibitors or other chemical in need of monitoring and tracing), therefore expensive and complicated functionalized methods are not required for the compositions and methods described herein.

An advantage of using GQD as the fluorescent nanoparticle is the high compatibility with water and spontaneous dispersion therein. Thus, GOD is readily dispersible and compatible in various treated fluids. Additional attractive features or properties of GQD include the abundance of starting materials for synthesis thereof, non-toxicity of GQD, case of preparation of GQD without relying on toxic precursors, and the ability to control Amax of the GQD by selecting the particle size of the GQD. In many of these features or properties, GQD are preferable to organic-based fluorescent "tagging" compounds that are not environmentally friendly, and in some cases are insoluble in or are incompatible with aqueous compositions. Additional description of quantum dots is described for example in U.S. Pat. No. 10,125,601, which is incorporated herein by reference.

Sol-gels can also include organically modified sol-gels and are used to form fluorescent nanoparticles. Material selection will determine porosity of the sol-gel nanoparticles. A variety of sol-gels can be utilized, including those prepared by polycondensation of tetraalkoxysilanes, and organically modified sol-gels prepared by copolymerization of mixtures of tetraalkoxysilanes with alkyl-alkoxysilanes in varying ratios, or from alkyl-alkoxysilanes only. Sol-gels can be made with mono-, di- or trialkylsilanes of general formula $(R_1)_x(R_2O)_{3-x}Si—R_1$ (where $R_1$ is alkyl or aryl, and $R_2$ is alkyl). The sol-gels are made fluorescent by non-covalent doping with various fluorophores.

Hydrophilic polymers can be used as fluorescent nanoparticles including hydrogels and other products such as cellulose. These can be referred to as nanogels and are soft and generally water soluble. In forming nanoparticles they are crosslinked or mixed with another material in order to form hybrid materials. Hydrogels are well permeable to ions and hydrophilic organic species such as glucose or amino acids (excluding large biomolecules). Exemplary polymers include polyacrylamide (PAA), polyurethanes, poly-(hydroxyethyl methacrylamide) (pHEMA), certain poly(ethyleneglycols) or specialty polymers such as Pluronic™ [a commercial poly(ethylene glycol)-co-poly-ethyleneoxide)]. Beneficially, their emission wavelengths can be adjusted to almost any wavelength between 300 and 1000 nm via a dopant, usually an organic or metal-organic fluorophore (e.g. fluoresceine) whose color, fluorescence, decay time and size are widely adjustable.

Hydrophobic organic polymers can be used as fluorescent nanoparticles. An exemplary hydrophobic organic polymer is a polystyrene nanoparticle that can be doped with an apolar fluorophore with a desired emission peak wavelength. These fluorescent nanoparticles can be surface modified with certain functional groups, e.g. amino groups introduced by the addition of co-reagents containing such groups to the monomer before starting emulsion polymerization. Polystyrene nanoparticle beads can be coated for example with polyaniline having pH dependent absorbance. Polyacrylonitrile (PAN) nanoparticle can also be doped with fluorophores for use as described herein.

Carbonaceous nanomaterials can be used as fluorescent nanoparticles and can include for example, nanosized carbon allotropes, such as fullerenes and larger species including carbon nanotubes, nanodiamonds, and the like. These materials do not require doping with fluorophores. In some embodiments, nano fluorescent graphite oxides can be utilized. In some embodiments the fluorescent carbon nanoparticles can have a molecular weight in certain preferred embodiments from about 400 Daltons to about 14,000 Daltons.

Upconversion nanoparticles (or also referred to as upconversion nanocrystals) can be used as fluorescent nanoparticles. The upconversion nanoparticles include hexagonal $NaYF_4$ nanocrystals doped with trivalent lanthanide ions such as Er(III), Yb(III) or Tm(III). The dopant is the emitter and additional doping with fluorophores is not needed. Single color emitting UCNPs of the $NaYbF_4$ type and emitting in the green, red and NIR, or consisting of lanthanide-doped $KMnF_3$ nanocrystals.

Noble metal nanoparticles can be used as fluorescent nanoparticles, including for example gold, silver and copper nanoparticles. The surface of these noble metal nanoparticles is often referred to as clusters. The clusters (gold and silver in particular) can be protected with alkanethiolate monolayers. In an exemplary embodiment, gold nanoclusters can be capped with 11-mercaptoundecanoic acid and loaded with Eu(III) ions.

Semiconducting polymer dots can be used as fluorescent nanoparticles. These are in addition to conventional dyed nanoparticles, such as those made from polystyrene, polyacrylamide, etc. The semiconducting (organic) polymer dots can be referred to as P-dots and are usually prepared by aromatic precursors with polymerizable double/triple bonds.

Dendrimers can be used as fluorescent nanoparticles. They can be prepared by emulsion polymerization or nanoprecipitation. Beneficially doping with a fluorophore is not needed as the backbone of the conjugated polymers acts as an array of light-harvesting units and display strong fluorescence.

Silica nanoparticles (SiNP) can be used as fluorescent nanoparticles. Various types of SiNP are commercially-available including for example, nanosilica, silicate nanoparticles, polyhedral oligomeric silsesquioxane nanoparticles, colloidal silica, silicon dioxide nanoparticle dispersion (SDND), and the like. In embodiments, SiNPs can be doped with various kinds of organic, metal-organic and metallic fluorophores that have a desired emission (i.e. wavelength (nm)). The SiNP materials can beneficially be utilized in a variety of fluids as their emission wavelengths can range from about 300 nm to about 1000 nm, with many SiNP having longwave (>600 nm) emissions.

Treatment Compounds

Treatment compounds can be provided at a point of use to a fluid in need of treatment therewith in combination with fluorescent nanoparticles. Alternatively, the treatment compound and fluorescent nanoparticles can be combined in a composition referred to as a "fluorescent treatment composition". Treatment compounds can include for example corrosion inhibitors, biocides, fungicides, scale inhibitors, hydrate inhibitors, paraffin inhibitors, asphaltene inhibitors, drag reducing agents, stabilizers, demulsifiers, hydrotropes, emulsion breakers, antifouling compounds, coagulants, flocculants, chelating agents, surfactants, oxygen scavengers, rheology control agents, surfactants, defoamers, foam inhibitors, dispersants, sulfide inhibitors, and the like. In embodiments the treatment compounds can include a corrosion inhibitor, biocide, scale inhibitor, hydrate inhibitor, paraffin inhibitor, asphaltene inhibitor, demulsifier, and/or foamer.

Additives or adjuvants such as solvents, polymers, surfactants, oils, fillers, buffers, viscosity modifiers, masking agents, colorants, and the like can further optionally be added to the compositions.

Treatment compounds can include corrosion inhibitors. Exemplary corrosion inhibitors include, but are not limited to, one or more mercaptoethanol, thioglycolic acid, sodium thiosulfate, imidazolines functionalized with fatty acid groups, alkylated cyclic amines such as imidazolines, triazoles, pyridines, pyrimidines, triazines, and the like, quaternary ammonium adducts of alkyl, aromatic, or mixed alkyl and aromatic hydrocarbons, phosphate esters of polyethylene oxide and the like. In embodiments, corrosion inhibitors include one or more of imidazoline, ammonium, alkylpyridine, phosphate ester, and/or thiol groups.

Treatment compounds can include biocides and antimicrobial compounds. Exemplary biocides and antimicrobials include, but are not limited to, compounds with a microbiostatic, disinfectant, or sterilization effect on the industrial water source when added thereto. Nonlimiting examples of antimicrobials include bactericides, fungicides, nematicides, and the like. Bactericides include active chlorine disinfectants, e.g. including hypochlorites, chlorine dioxide, and the like; phenols such as triclosan, phenol itself, thymol, and the like; cationic surfactants such as quaternary ammonium surfactants, chlorhexidine, and the like; ozone, permanganates, colloidal silver, silver nitrate, copper based compounds, iodine preparations, peroxides, and strong acids and strong alkalis wherein the water source is caused to have a pH of greater than about 12 or less than about 1. Fungicides include, but are not limited to, strobilurins such as azoxystrobin, trifloxystrobin and pyraclostrobin; triazoles and anilino-pyrimidines such as tebuconazole, cyproconazole, triadimefon, pyrimethanil; and additionally compounds such as triadimefon, benomyl, captan, chlorothalonil, copper sulfate, cyproconazole, dodine, flusilazole, flutolanil, fosetyl-al, gallex, mancozeb, metalaxyl, prochloraz, propiconazole, tebuconazole, thiophanate methyl, triadimenol, tridimefon, triphenyltin hydroxide, ziram, and the like.

Treatment compounds can include scale inhibitors. Exemplary scale inhibitors include, but are not limited to, oligomeric and polymeric compounds with borate, carboxylate, phosphate, sulfonate, or another anionic moiety. Scaling is the term used to describe the hard surface coating of calcium carbonate, magnesium carbonate, and byproducts thereof that forms on metallic surfaces within metal containments carrying industrial water sources with high total dissolved solids, such as produced water, brackish water, sea water, and other sources of divalent carbonates.

Treatment compounds can include hydrate inhibitors. Hydrate inhibitors include both kinetic hydrate inhibitors and anti-agglomerants. Kinetic hydrate inhibitors include hydroxyethylcellulose; alkyl glycosides; polymers having N-functional cyclic moieties and/or amide moieties attached to a hydrophobic group present within one or more repeat units thereof, including polyvinyllactams such as polyvinylpyrrolidone and related polymers, amine polyalkoxylates, and polydialkylacrylamides; and combinations of any of the foregoing with synergists including polyelectrolytes, polyether block copolymers, polyalkylacrylamides, and polyalkyloxazolines; quaternary ammonium surfactants, clathrates thereof, and combinations of these with one or more polymers having N-functional cyclic moieties and/or amide moieties attached to a hydrophobic group present within one or more repeat units thereof. Anti-agglomerants include surfactants that provide emulsions of hydrates confined within the water droplets, preventing agglomeration. Exemplary surfactants include diethanolamides, dioctylsulfosuccinates, sorbitans, ethoxylated polyols, ethoxylated fatty acids, ethoxylated amines, and polymeric surfactants based on polyalkenyl succinic anhydride.

Treatment compounds can include paraffin inhibitors. Exemplary paraffin inhibitors are polymeric compounds including, but not limited to, ethylene-vinyl acetate copolymers, alkylphenol-formaldehyde copolymers, acrylate and/or methacrylate (co) polymers, and copolymers comprising the residues of one or more alpha olefin monomers and a maleic anhydride monomer, the one or more alpha olefin monomers having the formula (I):

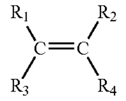

(I)

wherein $R_1$, $R_2$, $R_3$, and $R_4$, are independently selected from hydrogen and C5-C60 alkyl, with the proviso that at least two thereof are hydrogen; the alkyl maleic anhydride monomer having the formula (II):

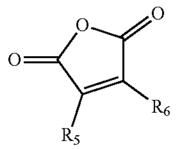

(II)

wherein $R_5$ and $R_6$ are independently selected from hydrogen or C1-C30 alkyl. In some embodiments, the maleic anhydride residue is further reacted with about 0.01 to 2.0 equivalents of a C12-C60 alkanol or amine per equivalent of anhydride.

Treatment compounds can include asphaltene inhibitors. Exemplary asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Treatment compounds can include demulsifiers (also referred to as emulsion breakers). Exemplary emulsion breakers include mixtures of one or more surfactants, water miscible solvents, and/or polymers that tend to resolve crude oil phases emulsified in a fluid, such as are commonly experienced in the recovery of crude oil from subterranean reservoirs when the crude oil product is contacted with e.g. wash water to remove water soluble impurities from the oil. Surfactants and water miscible solvents can further be included as emulsion breakers. Surfactants include anionic, nonionic, cationic, and zwitterionic surfactants that reduce the interfacial tension of water when added thereto. The type or use of surfactants is not limited. In some embodiments a surfactant is a polymeric surfactant. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference in their entirety and for all purposes. Polymers employed as emulsion breakers include polyalkylene oxide homopolymers and copolymers, polyethyleneimines and functionalized versions thereof, and crosslinked versions of such polymers in addition to other types of non-ionic water dispersible polymers. Other emulsion breaking compounds are cationic oligomers and polymers having quaternary ammonium functionality. Treatment compounds can include foamers or defoamers. Numerous other treatment compounds suitable for use as an oilfield chemical, water treatment chemical, geothermal chemical, chemicals in gas, liquid and/or supercritical fluids lines and systems, or combinations thereof are included within the scope of treatment compounds for use in the compositions and methods described herein.

Compositions

The fluorescent nanoparticles can be provided at a point of use to a fluid in need of treatment therewith in combination with a treatment compound (e.g. oilfield chemical(s)). Alternatively, the fluorescent nanoparticles can be combined in a composition with a treatment compound (e.g. oilfield chemical(s)). The compositions combining the fluorescent nanoparticles and treatment compound(s) can be referred to as a "fluorescent treatment composition".

The fluorescent treatment compositions can be applied to a fluid in any form compatible with the treatment components. In certain embodiments, the fluorescent treatment composition is applied as a solution, emulsion, dispersion, or as the solid composition, wherein "solid" in this context means the treatment composition does not include any additional solvents or other additives to achieve a fluid composition. In such embodiments, the treatment compositions are 100% active ingredients, wherein the active ingredients include at least a fluorescent nanoparticle and treatment compound, and optionally include the additional additives or adjuvants.

In embodiments the fluorescent nanoparticle is in a ratio with the treatment compound (e.g. an oilfield chemical) in the composition between about 1:10 to about $1:1\times10^{11}$ by weight, or about 1:10 to about $1:1\times10^{4}$ by weight.

The fluorescent nanoparticles comprises from about 0.0001 wt % to about 5 wt %, from about 0.0001 wt % to about 4 wt %, from about 0.0001 wt % to about 3 wt %, from about 0.0001 wt % to about 2 wt %, from about 0.0001 wt % to about 1 wt %, from about 0.0001 wt % to about 0.5 wt %, from about 0.0001 wt % to about 0.1 wt %, from about 0.0001 wt % to about 0.01 wt %, from about 0.001 wt % to about 5 wt %, from about 0.001 wt % to about 4 wt %, from about 0.001 wt % to about 3 wt %, from about 0.001 wt % to about 2 wt %, from about 0.001 wt % to about 1 wt %, from about 0.001 wt % to about 0.5 wt %, from about 0.001 wt % to about 0.1 wt %, from about 0.001 wt % to about 0.01 wt %, from about 0.01 wt % to about 5 wt %, from about 0.01 wt % to about 4 wt %, from about 0.01 wt % to about 3 wt %, from about 0.01 wt % to about 2 wt %, from about 0.01 wt % to about 1 wt %, from about 0.01 wt % to about 0.5 wt %, from about 0.01 wt % to about 0.1 wt %, from about 0.05 wt % to about 5 wt %, from about 0.05 wt % to about 4 wt %, from about 0.05 wt % to about 3 wt %, from about 0.05 wt % to about 2 wt %, from about 0.05 wt % to about 1 wt %, or from about 0.1 wt % to about 5 wt %, of the composition.

The treatment compound(s) comprises from about 0.01 wt % to about 99.9 wt %, from about 0.1 wt % to about 50 wt %, from about 1 wt % to about 50 wt %, from about 1 wt % to about 40 wt %, or from about 1 wt % to about 30 wt % of the composition.

The additives and/or adjuvants (e.g. solvent) can optionally comprise from about 0.1 wt % to about 90 wt %, from about 0.5 wt % to about 90 wt %, from about 1 wt % to about 90 wt %, from about 5 wt % to about 90 wt %, from about 5 wt % to about 80 wt %, or from about 10 wt % to about 80 wt %.

Methods of Use

A method of treating a fluid is provided. Fluids include liquids and gases. As referred to herein, fluids can include those in oil and gas pipelines, natural gas processing plants and pipelines, and other applications, including containing water and/or oil, produced water, water and other fluids in pipelines, such as transporting water, and fluids in water transmission pipelines, cooling water, geothermal lines, nuclear water systems, carbon dioxide transportation lines, liquid or supercritical carbon dioxide lines and systems, liquid hydrogen transportation, liquid ammonia and the like.

The fluids can include water that is condensed water containing negligible or no total dissolved solids (TDS) to high levels of TDS, such as up to approximately 450,000 ppm, without or without entrained hydrocarbon.

The fluids contain at least one process chemical(s), such as oilfield chemicals, cooling water chemicals, geothermal water/fluid chemicals, water treatment chemicals, and the like. These process chemicals are referred to herein as treatment compounds. In preferred embodiments, the fluid is produced water generated by hydrocarbon recovery from one or more subterranean reservoirs.

The fluid, including liquid or gas, in which the compositions of the disclosure are introduced can be contained in and/or exposed to many different types of apparatuses. For example, the fluid can be contained in an apparatus that transports liquids or gas from one point to another, such as an oil or gas pipeline. The apparatus can be part of an oil and/or gas refinery such as a pipeline, a separation vessel, a dehydration unit, or a gas line. The fluid can also be contained in and/or exposed to an apparatus used in oil extraction and/or production, such as a wellhead.

In some embodiments, a method of the present disclosure may be carried out by treating a fluid as described above, including natural gas and/or liquid stream with an effective amount of a composition as described herein. The methods may be carried out in aqueous systems, oil systems and/or gas systems. For example, certain embodiments of the methods may include applying a composition disclosed herein to a gas or liquid produced or used in the production, transportation, storage and/or separation of crude oil or natural gas. In some embodiments, the composition may be applied to a gas stream used or produced in a coal-fired process or natural gas. The methods described herein can be used for measuring chemicals, namely treatment compounds used in these fluids, including process chemical(s), such as oilfield chemicals, cooling water chemicals, geothermal water/fluid chemicals, water treatment chemicals, and the like.

In some embodiments, the transportation of the fluids described, including liquid hydrogen transportation, liquid ammonia, and liquid supercritical carbon dioxide, are marked for identification purposes. In an embodiment, different producers may both be moving liquid hydrogen through the same pipeline in sequential batches and through implementation of the methods described herein are still able to differentiate them from one another. The methods described herein can be used for measuring chemicals used in the transport of the various fluids.

In some embodiments, an amine unit provides gas treatment with amine and is also known as amine scrubbing, gas sweetening, or acid gas removal. These types of processing use aqueous solutions of various amines, typically alkylamines to remove hydrogen sulfide and carbon dioxide from gases. The amine unit is a common unit process used in crude oil refineries and it is also used in petrochemical plants, natural gas processing plants and other industries where removal of acid gases is advantageous. The methods described herein can be used for measuring chemicals used in these units.

The methods include adding a fluorescent treatment composition (or the individual components thereof) to a fluid, such as a fluid in oil and gas pipelines, to measure the concentration of a treatment compound in the fluid. It is desirable to measure a treatment compound and provide chemical assurance as the treatment compounds provide a desired treatment outcome within the fluid and therefore require a threshold concentration for efficacy. For example, for a treatment compound comprising a corrosion inhibitor the chemistry is added into the fluid (e.g. water and hydrocarbon fluids) in the presence of other species, such as sand, iron sulfide, scale, etc. In such an exemplary embodiment, the corrosion inhibitor can adsorb to the metal surfaces in contact with the fluid and also remain in the hydrocarbon phase where some is lost to sand, iron sulfide, debris particles, etc. resulting in less free residual corrosion inhibitor present in the bulk water phase. In other fluid systems, including cleaner systems, such as cooling water systems or geothermal water systems, corrosion inhibitors can be lost to the metal surface, small fines, scale particles, biofilms, etc. In each of these embodiments, the need for quantification of the corrosion inhibitor through chemical assurance methods described herein are desirable.

The contacting of the fluorescent treatment composition (or the individual components thereof) with the fluid forms a treated fluid. In some embodiments, the step of adding the fluorescent treatment composition (or the individual components thereof) provides the fluorescent nanoparticle in a ratio with the treatment compound (e.g. an oilfield chemical) the composition is about 1:10 to about $1:1\times10^{11}$ by weight, or about 1:10 to about $1:1\times10^{4}$ by weight.

In some embodiments the adding of the fluorescent treatment composition is applied to the fluid as an injectate. In such embodiments, the injectate is injected into a subterranean reservoir and later re-collected as produced water after one or more hydrocarbon recovery operations such as hydraulic fracturing or tertiary oil recovery. In other embodiments, the fluorescent treatment composition is applied to a produced water before or after bulk separation thereof from the crude oil products initially collected during the one or more hydrocarbon recovery operations. The applying of the fluorescent treatment composition is carried out at any location and in any manner suitable to provide the treatment compound to the fluid in need thereof.

In embodiments, the fluorescent treatment composition is a fluorescent treatment concentrate. In embodiments, the applying includes applying an amount of the fluorescent nanoparticle and treatment compound, the fluorescent treatment composition, or fluorescent treatment concentrate, that is effective to carry out the intended treatment, further wherein the amount of fluorescent treatment compound applied is sufficient to quantify the amount thereof at least at one point downstream of the applying.

The methods described are for measuring the concentration of the treatment compound, such as an oil field chemical. The methods do not assess for qualitative assessments of the fluids, containments, reservoirs or the like which the fluorescent treatment composition and the treated fluid contact. For example, the intended treatments in need of measuring, detecting and/or tracing include inhibiting corrosion of surfaces contacted by the fluid, disinfecting or sterilizing the fluid, preventing scale buildup due to the presence of e.g. calcium salts in the fluid, inhibiting paraffin solidification and phase separation from the fluid, stabilizing the fluid against freezing, preventing phase separation in the fluid, resolving emulsified compounds from the fluid, prevention of equipment fouling by components of the fluid, precipitating, coagulating, or flocculating components of the fluid, chelating metal ions present in the fluid, and the like. By applying the fluorescent treatment compositions to the fluid, the amount of fluorescent treatment compound is effective to quantify the concentration of the treatment compound at least at one point downstream from the applying.

Beneficially the low levels of the fluorescent nanoparticle employed in the fluorescent treatment compositions obviates the need to recover the compositions and/or the fluorescent nanoparticle from a treated fluid.

In an exemplary and non-limiting embodiment, a fluorescent treatment composition includes a corrosion inhibitor. It will be understood that the exemplary embodiment is not limiting and is provided solely to impart an understanding of the fluorescent treatment composition and use of various fluorescent treatment compositions described herein. In such embodiments, the composition is applied to a fluid in need of corrosion inhibition. In an embodiment where the effective amount of the corrosion inhibitor in the fluid as determined by the operator is 100 ppm by weight, and the effective amount of fluorescent nanoparticle needed to quantify the amount thereof downstream from the applying is 0.1 ppm by weight, then the ratio of fluorescent nanoparticle to the corrosion inhibitor in the fluorescent treatment composition is about 1:1000. The ratio selected is thus dictated by the specific treatment compound, specific fluid in need of treatment, and concentration of fluorescent nanoparticle needed for effective quantification downstream from the applying of the fluorescent treatment composition. The rate of applying the composition to the fluid is dictated by the rate of flow of the fluid within a containment such as a pipeline (e.g. metal pipe), wherein the rate of addition is suitable to provide about 100 ppm of corrosion inhibitor to the fluid.

In embodiments the concentration of the fluorescent nanoparticle in the treated fluid is at least about 0.1 ppb by weight and the total concentration of the fluorescent treatment composition (e.g. fluorescent nanoparticle and the treatment compound) in the treated fluid is about 5 ppm to 10,000 ppm by weight, or about 5 ppm to 5,000 ppm by weight. In embodiments the concentration of the fluorescent nanoparticle in the treated fluid is at least about 0.1 ppb to about 1000 ppm, or about 0.1 ppb to about 500 ppm.

By employing fluorescent treatment compositions containing the fluorescent nanoparticle and the treatment compound, the aqueous solubilities of the components in solution or suspension are caused to be similar. Assuming good mixing of the components in the fluid and no preferential adsorption of either of the components on surfaces contacted by the fluid, the components are expected to be present within the treated fluid at substantially the same molar ratios, including a consistent ratio of the components downstream from a point of applying the composition. This beneficially allows the treated fluid to be measured for fluorescence emission that determines the amount of the treatment compound in the treated fluid.

The methods described herein include measuring the treated fluid for fluorescence emission to determine the amount of the treatment compound in the treated fluid.

In some embodiments the methods include filtering the fluid after adding the treatment compound and before irradiating the treated fluid. However, one skilled in the art will ascertain that filtering step is not needed for fluids, such as water, that are clean and do not include particles that would interfere with measuring the fluorescence of the nanoparticles. In embodiments where a filtration step is employed a filter, such as about 0.20 um (200 nm) or greater, about 0.30 um (300 nm) or greater, or about 0.45 um (450 nm) or greater is selected. The selection of the filter size ensures that the fluorescent nanoparticles are not filtered out with the particles or other components separated from a turbid sample of fluid. One or more filtration steps can be applied to a treated fluid sample.

The methods include irradiating the treated fluid with a source of light having a selected first range of wavelengths and measuring luminescent emission of the treated fluid at a selected second range of wavelengths, and wherein the luminescent emission is proportional to the concentration of the treatment compound in the treated fluid. The measurement can be achieved through use of a fluorescent probe, such as a high pressure fluorescence probe, to detect the nanoparticle fluorescence (to correspond to the residual chemical). In embodiments the fluorescent probe is in-line and remains within the system housing the fluid.

In some embodiments, the measuring is carried out substantially contemporaneously with the irradiating. In other embodiments, the irradiating and measuring are carried out at substantially regular intervals of about 1 second to 1 week, or every hour(s), or any other user preferred interval. In still other embodiments, the irradiating and measuring are carried out irregularly, sporadically, randomly, or on-demand by an operator.

In embodiments the fluorescent nanoparticle typically has fluorescence emission at a wavelength of about 300 nm to about 1,000 nm, or about 550 nm to about 1,000 nm. In some embodiments, the fluorescent nanoparticle typically has fluorescence emission at a wavelength greater than about 450 nm, or greater than about 550 nm, which is generally outside the spectral emission range of many treatment compounds entrained within fluids in need of treatment. Further, the emission spectra of the fluorescent nanoparticle (e.g. GQD) are suitably selected or adjusted by selecting or adjusting a fluorescent nanoparticle particle size to provide the targeted range of emission wavelengths. Alternatively, fluorescent nanoparticles of different sizes are suitably blended to provide a targeted range of emission wavelengths. Thus, the fluorescent nanoparticle can be easily isolated from background fluorescence signals produced by fluids, providing accurate quantification of the treatment compound (e.g. corrosion inhibitor or other oilfield chemical) in the fluorescent treatment composition applied thereto.

The $\lambda_{max}$ of many fluorescent nanoparticles is about 300 nm to 1000 nm, wherein the excitation wavelength is optimized based on the fluorescent nanoparticle employed in the compositions and methods.

In other embodiments, the $\lambda_{max}$ of many fluorescent nanoparticles is about 300 nm to 550 nm, for example about 350 nm to 550 nm, or about 400 nm to 550 nm, or about 450 nm to 550 nm, or about 500 nm to 550 nm, or about 300 nm to 500 nm, or about 300 nm to 450 nm, or about 300 nm to 400 nm, with peak emission intensity of the fluorescent nanoparticles occurring between about 500 nm to 700 nm, or about 550 nm to 700 nm, or about 600 nm to 700 nm, or about 500 nm to 650 nm, or about 500 nm to 600 nm. In embodiments, the "red shift" of excitation to peak emission intensity wavelengths for the fluorescent nanoparticles is about 50 nm to 200 nm, or about 50 nm to 150 nm, or about 50 nm to 100 nm, or about 100 nm to 200 nm, or about 100 nm to 150 nm.

The emission, i.e. luminescence spectra of the fluorescent nanoparticles highlight a surprising and highly advantageous property thereof: the fluorescent emission of the fluorescent nanoparticles can be easily separated from the fluorescent emissions of hydrocarbons and other compounds and materials entrained in the fluids in need of treatment. For example, Karpicz, R., et al., *Lithuanian J. Physics* (2005) 45:213-218 report the peak emission wavelengths of crude hydrocarbon oil to be in the range of about 500 nm to 550 nm in many instances, with some refined petroleum products having peak emission intensity somewhat lower than this (e.g. 375 nm-450 nm). In embodiments of treating fluids, using 2=500 nm as the excitation wavelength, the emissions intensity peak occurs at about 550 nm, with very low intensity emission at about 575 nm. Thus the peak emission intensity of the fluorescent nanoparticles is easily differentiated from the "background" emission of the crude hydrocarbon oil entrained in a fluid by selecting fluorescent nanoparticles having a peak emission intensity greater than 550 nm, for example 575 nm or greater, such as up to 650 nm, for example. By sufficiently separating the "background" fluorescence of entrained materials present in fluids, the concentration of the fluorescent nanoparticles in the treated fluid is easily measured in the presence of the entrained materials.

Thus, in embodiments, a method of treating a fluid comprises applying a fluorescent treatment composition (or the individual components thereof) to the fluid to form a treated fluid source, wherein the fluorescent treatment composition comprises the fluorescent nanoparticle and treatment compound. The fluorescence of the treated fluid is measured at least at one point downstream from the application and the dosing (rate of applying) is optionally adjusted based on the measured fluorescence. Automated dosage control of the treated fluid can be achieved via fluorescence measurements, wherein measured amount of fluorescence downstream is used to direct the rate of applying the fluorescent treatment composition at the location of the applying.

The total amount of treatment compound is determined by first determining the quantum yield and emission spectrum of the fluorescent nanoparticle (that is, the characteristic wavelengths and intensity of luminescence generated by exciting the particular fluorescent nanoparticle, e.g. GQD, with a selected wavelength of light) at a selected wavelength, for example $\lambda_{max}$, then applying an amount of the fluorescent treatment composition in a known ratio to a fluid (e.g. injectate, gas or produced water). The amount of the treatment compound is then determined at any point in the flow of the treated fluid downstream from the applying by exciting the treated fluid with the selected wavelength of light and measuring the intensity of a characteristic emission wavelength.

In embodiments, a method for determining the concentration of treatment compound in a fluid comprises generating a calibration curve for said treatment compound in said fluid. In such embodiments, the fluorescence for a sample of the fluid without treatment compound is measured with predetermined excitation and emission wavelengths (e.g. using a blue LED light source with excitation wavelength of 475±15 nm and emission wavelength of 515±20 nm). This measurement is the background measurement, or the "zero" point for the calibration. The method further comprises adding to individual samples of the fluid, varying concentrations of a treatment compound (e.g. corrosion inhibitor) and fluorescent nanoparticle (e.g. GQD), wherein the ratio of fluorescent nanoparticle to treatment compound remains constant. As a non-limiting example, in embodiments of the method, GQD is added to a corrosion inhibitor (CI) at approximately 300 ppm. The CI-GQD composition is added to samples of the fluid at various predetermined concentrations (e.g. 0 to 1,000 ppm). The fluorescence of each sample, each with varying known concentrations of the treatment compound and fluorescent nanoparticle is measured, using the same light source. The fluorescence measurements are then used to generate a calibration curve. In embodiments, at least three known concentrations are utilized. The method further comprises measuring the fluorescence of the fluid with an unknown amount of treatment compound and comparing to the calibration curve to determine the concentration of treatment compound. In embodiments, various light sources may be used, for example a blue light source with excitation and emission wavelengths of 475±15 nm and 515±20 nm or a green light with excitation and emission wavelengths of 525±20 nm and >570 nm. In embodiments, the light source and excitation and emission wavelengths are adjusted or selected depending on the selected fluorescent nanoparticle and its associated properties including associated maximum excitation and emission wavelengths.

The step of measuring luminescent emission of the treated fluid can be conducted by fluorometric analysis using a light source and a fluorescence detector or probe (e.g., fluorometer) configured to fluorometrically detect fluorescence as known in the art. In some embodiments, the fluorometric analysis is carried out using a light source capable of shining light at a particular wavelength, or range thereof, into a treated fluid, as well as measuring luminescent emission of the treated fluid. An example of a commercially-available fluorometer is a Picofluor™ 8000-004 handheld fluorometer.

The irradiating and the measuring may be in real time, in near-real time, or in offline/batch mode. In embodiments, the irradiating and the measuring is accomplished in situ, for example irradiating and measuring a dynamic flow within a pipe (real time) or irradiating and measuring of a stream diverted from a flow within a pipe (near real time), or irradiating and measuring a periodic collection of the output at the end of a pipe (batch mode). Near-real time measuring is where there is a 1 second to 1 minute delay between the diverting of the fluid and the irradiating/measurement; such measurements are made, for example, by diverting fluid flows and measuring the diverted fluid 1 second to 1 minute after the point of diversion.

In embodiments, more than one fluorescent nanoparticle and treatment compound can be employed. In an embodiment, a fluorescence probe can detect the maximum excitation wavelength for more than one fluorescent treatment composition or fluorescent nanoparticle. For example, fluorescence probe can be sequenced to measure on any determined time interval to detect a different nanoparticle present corresponding to a different treatment compound (e.g. wavelength 1, 2, 3, 4, 5) corresponding to a fluorescent nanoparticle 1, 2, 3, 4, 5.

Beneficially, the methods as described provide the ability to monitor, measure and control the dosage of treatment compounds (e.g. oilfield chemicals such as corrosion inhibitors) online and in real time. In an embodiment the methods provide for real-time measurement of treatment component (e.g. corrosion inhibitor) concentration within a pipe or other containment housing the fluid. The ability to automate treatment of fluids such as those contained in oil and gas pipelines improves the efficiency, improves the accuracy, and can reduce total cost of operations. The compositions and methods described herein can also allow for more accurate chemical dosing for performance optimization. Moreover, the compositions and methods described herein can provide alarms on system issues, such as pump failures and empty chemical tanks, thereby reducing system upsets.

The fluorescent treatment compositions (or the fluorescent nanoparticles alone) may be applied to fluids that exhibit background (native) fluorescence when exposed to certain excitation wavelengths. In certain embodiments, the methods as described herein overcomes problems unarticulated in the art related to signal interference, i.e., overlap of fluid fluorescence emission wavelengths and treatment compound background fluorescence emission wavelengths. In some embodiments, fluids exhibit fluorescence emissions at wavelengths of less than about 550 nm, such as various oil and gas applications which are subject to interference due to background fluorescence emission wavelengths. Other fluids can experience background fluorescence emission wavelengths as well, such as non-oilfield water sources, e.g. water from cleaning.

In some such embodiments, the fluorescent treatment compositions (and the fluorescent nanoparticles) exhibit fluorescence at wavelengths greater than about 550 nm. Thus, in certain embodiments, a fluorescent treatment composition (and the fluorescent nanoparticle) has a fluorescence emissions wavelength that does not substantially overlap with the fluorescence emissions of the fluid to be treated. In some such embodiments, a fluorescent treatment compositions (and the fluorescent nanoparticles) have a fluorescence emissions wavelength that does not overlap with any fluorescence emissions wavelength of the fluid to be treated.

The fluorescent treatment compositions are suitably applied to a fluid having a pH of from about 1 to about 13, for example from about 2 to about 12, from about 2 to about 11, from about 2 to about 10, from about 2 to about 9, from about 2 to about 8, from about 2 to about 7, from about 2 to about 6, from about 2 to about 5, from about 4 to about 11, from about 5 to about 11, from about 6 to about 11, from about 7 to about 11, from about 8 to about 11, from about 8 to about 10, from about 3 to about 10, from about 4 to about 10, from about 4 to about 8, or from about 5 to about 8. In an exemplary embodiment for an oilfield fluid a preferred pH is between about 2 and about 8, or between about 2 and about 6.

While fluorescent treatment compositions are suitably applied to a fluid at any selected dosage rate, a fluorescent treatment composition is generally most effective at a dosage rate of from about 0.001 ppm to about 1,000 ppm based on weight of the industrial water source, or about 0.01 ppm to about 500 ppm, or about 0.01 ppm to about 100 ppm, or about 0.01 ppm to about 75 ppm, or about 0.01 ppm to about 50 ppm, or about 0.01 ppm to about 25 ppm, or from about 0.01 ppm to about 10 ppm, or about 0.01 ppm to about 5 ppm based on weight of the fluid.

In other embodiments, a fluorescent treatment composition is generally most effective at a dosage rate of from about from about 0.1 ppm to about 100 ppm, from about 0.1 ppm to about 75 ppm, from about 0.1 ppm to about 50 ppm, from about 0.1 ppm to about 25 ppm, from about 0.1 ppm to about 10 ppm, from about 0.1 ppm to about 5 ppm, from about 1 ppm to about 100 ppm, from about 1 ppm to about 75 ppm, from about 1 ppm to about 50 ppm, from about 1 ppm to about 25 ppm, from about 1 ppm to about 10 ppm, from about 5 ppm to about 100 ppm, from about 10 ppm to about 100 ppm, from about 25 ppm to about 100 ppm, or from about 50 ppm to about 100 ppm based on weight of the fluid.

In certain embodiments, the measuring of the luminescent emission of the treated fluid then optionally informs a need to adjust dosage of the treatment compound. In some embodiments, the measurements provide chemical injection assurance, such as measuring chemical form a chemical tank being injected into the fluid. The measurements can detect and inform an operator of changes in the chemical injection, such as a chemical running out of the tank, errors or changes in an injection pump, or any other change in chemical pumping/injection into the fluid. Accordingly, the methods can include a step of adjusting a dosage of one or more treatment compounds or of the fluorescent treatment composition. In an embodiment, for example, the methods can inform the need to adjust dosage of a treatment compound such as a corrosion inhibitor to adjust the dosage of the treatment compound that is applied to the surfaces (i.e. metal surfaces) the fluid is in contact with, such as the interior of a carbon steel pipe.

The methods provide treatment compound assurance as opposed to monitoring fluid flow.

The methods described herein overcome significant limitations of various conventional tracers and flow measurement techniques. Beneficially, the methods do not employ or require use of secondary tracers. Non-limiting examples of suitable secondary tracers include alpha-, beta-, or gamma-emitters (e.g. radioactive bromide), perhalogenated compounds (e.g. perfluoromethylcyclopentane), light-absorbing dyes (e.g. methylene blue), fluorescent dyes (e.g. fluorescein, rhodamine INT, eosin Y, etc.) and electrically charged compounds (e.g. lithium, sodium, chloride, bromide).

EMBODIMENTS

The present disclosure is further defined by the following numbered embodiments:

1. A fluorescent treatment composition comprising: from about 0.0001-5 wt % of a fluorescent nanoparticle comprising at least one of graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores; and a treatment compound comprising an oilfield chemical, water treatment chemical, geothermal chemical, chemicals in gas, liquid and/or supercritical fluids lines and systems, or combinations thereof, wherein the composition luminesces at a determined wavelength between about 300 nm to about 1,000 nm when excited by light having a wavelength determined by the fluorescent nanoparticle.
2. The composition of embodiment 1, further comprising an additive and/or adjuvant.
3. The composition of embodiment 2, wherein the additive and/or adjuvant is a solvent comprising from about 0.1 wt % to about 90 wt % of the composition.
4. The composition of any one of embodiments 1-3, wherein the treatment compound comprises at least one oilfield chemical, cooling water chemical, geothermal water or fluid chemical, or combinations thereof.
5. The composition of embodiment 4, wherein the oilfield chemical is selected from the group consisting of a corrosion inhibitor, biocide, scale inhibitor, hydrate inhibitor, paraffin inhibitor, asphaltene inhibitor, demulsifier, and foamer.
6. The composition of any one of embodiments 1-5, wherein the ratio of the fluorescent nanoparticle to the oilfield chemical(s) is about 1:10 to about $1{:}1\times10^{11}$ by weight, or about 1:10 to about $1{:}1\times10^{4}$ by weight.
7. The composition of any one of embodiments 1-6, wherein the composition luminesces at a wavelength of about 600 nm to 700 nm when excited by light having a wavelength of about 500 nm.
8. The composition of any one of embodiments 1-7, wherein the oilfield chemical(s) comprises from about 0.01 wt % to about 99.9 wt % of the composition.
9, The composition of any one of embodiments 1-8, wherein the fluorescent nanoparticle is a graphene quantum dot that is not functionalized and/or covalently bonded to the oilfield chemical(s).
10. The composition of embodiment 9, wherein the graphene quantum dot has a particle size from about 1 nm to 20 nm.
11. A method of measuring a concentration of a treatment compound in a fluid comprising: adding a fluorescent treatment composition according to any one of embodiments 1-10 to the fluid to form a treated fluid; irradiating the treated fluid with a source of light having a selected first range of wavelengths; measuring luminescent emission of the treated fluid at a selected second range of wavelengths, and wherein the luminescent emission is proportional to the concentration of the treatment compound in the treated fluid.
12. The method of embodiment 11, wherein the single wavelength of the first range of wavelengths is about 450 nm, about 500 nm, about 550 nm, or about 600 nm.
13. The method of any one of embodiments 11-12, wherein the second range of wavelengths is between about 300 nm and 1,000 nm, or between about 550 nm and 1,000 nm, and is a substantially single wavelength.
14. The method of any one of embodiments 11-13, wherein the concentration of the fluorescent nanoparticle in the treated fluid is at least 0.1 ppb by weight, and/or wherein the total concentration of the fluorescent treatment composition in the treated fluid is about 5 ppm to 10,000 ppm by weight.
15. The method of any one of embodiments 11-14, wherein a fluorometer is used to irradiate the treated fluid, and wherein the fluorometer comprises a light source and a fluorescence detector or probe.
16. The method of any one of embodiments 11-15, wherein the measuring is carried out substantially contemporaneously with the irradiating, at substantially regular intervals of about 1 second to 1 week, or carried out irregularly, sporadically, randomly, or on-demand by an operator.

17. The method of any one of embodiments 11-16, wherein the fluid comprises produced water, water and/or oil, gases, and/or fluids in pipelines, geothermal lines, nuclear water systems, carbon dioxide transportation lines, liquid or supercritical carbon dioxide lines and systems, liquid hydrogen transport, liquid ammonia.
18. The method of any one of embodiments 11-17, wherein the fluid comprises condensed water or water containing up to about 450,000 ppm total dissolved solids (TDS), without or without entrained hydrocarbon.
19. The method of any one of embodiments 11-18, wherein the fluid is housed in a pipeline, line or containment.
20. The method of any one of embodiments 11-19, wherein a fluorescent probe measures the luminescent emission.
21. The method of embodiment 20, wherein the fluorescent probe is calibrated to measure a plurality of luminescent emissions corresponding to a plurality of treatment compounds, and wherein the treatment compounds comprise an oilfield chemical, water treatment chemical, geothermal chemical, chemicals in gas, liquid and/or supercritical fluids lines and systems, or combinations thereof.
22. The method of any one of embodiments 11-21, wherein the measuring is carried out at least at one point downstream from the addition of the fluorescent treatment composition.
23. The method of any one of embodiments 11-22, wherein the measured luminescent emission is used to direct the rate of adding the fluorescent treatment composition to the fluid at the upstream location of the addition.
24. The method of any one of embodiments 11-23, wherein the method comprises generating a calibration curve for determining the concentration of the treatment compound in the treated fluid.
25. The method of embodiment 24, wherein the generating a calibration curve comprises: irradiating and measuring luminescent emission of the fluid without the fluorescent nanoparticle; irradiating and measuring luminescent emission of the fluid with at least three known concentrations of the treatment compound; and generating a calibration curve, wherein the irradiation and luminescent emission wavelengths are substantially the same for each measurement.
26. The method of any one of embodiments 24-25, wherein the method further comprises comparing the luminescent emission of the treated fluid to the calibration curve to determine the concentration of the treatment compound.
27. The method of any one of embodiments 11-26, further comprising a filtration step to remove particles from the treated fluid to avoid interference with the measuring of the luminescent emission of the fluid.
28. A method of measuring a concentration of a treatment compound in a fluid comprising: adding a fluorescent nanoparticle and a treatment compound to the fluid to form a treated fluid; irradiating the treated fluid with a source of light having a selected first range of wavelengths; and measuring luminescent emission of the treated fluid at a selected second range of wavelengths, wherein the measuring is carried out substantially contemporaneously with the irradiating, wherein the fluorescent nanoparticle comprises at least one of graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores; wherein the treatment compound comprises an oilfield chemical, water treatment chemical, geothermal chemical, other chemicals in gas, liquid and/or supercritical fluids lines and systems, or combinations thereof; and wherein the steps of adding the fluorescent nanoparticle and the treatment compound can be combined in a single step or separately added to the fluid.
29. The method of embodiment 28, wherein the single wavelength of the first range of wavelengths is between about 450 nm and 600 nm or preferably about 500 nm, and wherein the second range of wavelengths is between about 300 nm and 1,000 nm, or between about 550 nm and 1,000 nm, and is a substantially single wavelength, and wherein the concentration of the fluorescent nanoparticle in the treated fluid is at least 0.1 ppb by weight, and/or wherein the total concentration of the fluorescent treatment composition in the treated fluid is about 5 ppm to 10,000 ppm by weight.
30. The method of any one of embodiments 28-29, wherein a fluorometer is used to irradiate the treated fluid and measure luminescent emission of the treated fluid, and wherein the fluorometer comprises a light source and a fluorescence detector or probe.
31. The method of any one of embodiments 28-30, wherein the method comprises generating a calibration curve for determining the concentration of the treatment compound in the treated fluid.
32. The method of embodiment 31, wherein the generating a calibration curve comprises: irradiating and measuring luminescent emission of the fluid without the fluorescent treatment; irradiating and measuring luminescent emission of the fluid with at least three known concentrations of the treatment compound; and generating a calibration curve, wherein the irradiation and luminescent emission wavelengths are substantially the same for each measurement.
33. The method of any one of embodiments 28-32, wherein the method comprises comparing the luminescent emission of the treated fluid to the calibration curve to determine the concentration of the treatment compound.
34. The method of any one of embodiments 28-33, further comprising a filtration step to remove particles from the treated fluid to avoid interference with the measuring of the luminescent emission of the fluid.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

A trial was conducted to validate field calibration procedures developed by diagnostic solutions to confirm correlation between an oilfield chemistry, such as the corrosion inhibitor (CI) injection rate and measured fluorescence using fluorescent nanoparticles. The testing further included a determination as to whether any background florescence of the fluorescent nanoparticles when no CI was injected. Work was also done to determine the average values of florescence at different CI injection rates over time, where injection rate can be plotted as a function of time. The testing confirms the described methods for residual measurement techniques that beneficially combine the speed of standard colorimetric (methyl orange) measurement with the accuracy of lab techniques such as LC-MS. The trials confirm that the field measured values are sufficiently accurate to product dosage to provide operations with actionable data on injection assurance.

The first trial was conducted in the field where a CI (6.5% imidazoline, 6.5% quaternary ammonium compounds, about 2.5% mercaptoethanol and the remainder water) with 1% fluorescent nanoparticle—graphene quantum dot (GQD) was injected at varied rates providing approximately 300 ppm GQD in the product. The GQD was commercially purchased containing approximately 3% GQD in methanol.

The tests were conducted at a well as depicted in FIG. 1 ("Trial 1"). The test system did not contain any additional process streams to provide interference. The system makes approximately 1,400 barrels of water per day (BWPD), with a water cut of 99%, and an emulsion breaker injected upstream of the separator.

Figure 2:
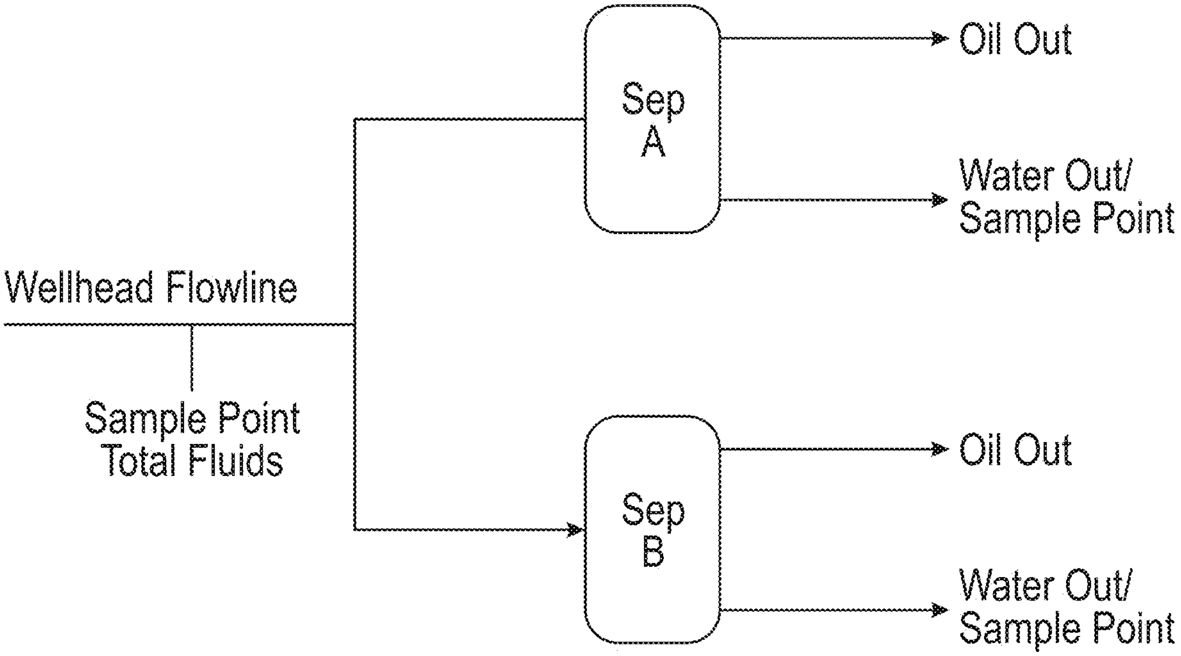
FIG. 2 shows a flow diagram of another field system where tests were conducted as described in Example 1 and represents a non-limiting embodiment of the methods as described herein.

The second trial was conducted in the field using the same CI/GQD injected at higher rates to determine the relationship between the same fluorescent nanoparticle in a higher flowing system. The tests were conducted at a separation system in the flow diagram depicted in FIG. 2 ("Trial 2"). This process contained a single flowline from the wellhead flowing to two oil water separators marked A and B. This test system makes approximately 2,950 BWPD, with a water cut of 97%.

In both trials water samples were collected from the separator and attention was paid to avoid oil/emulsions in collected samples as that would heavily influence the measurement of fluorescence using the handheld fluorometer or generally referred to as a handheld detector. In the second trial samples were pulled from the total fluids along with both separators. The detector uses florescence of light to detect a set wavelength in the sample, therefore turbid samples would influence collected measurements. To avoid interference with partials and oil suspended in solution, a 0.45 μm filter was used to separate each sample before measurement. In some cases, filtration was not enough to perform sufficient separation of the sample and more filtrations would be required.

Fluorescent measurements were made using a calibrated Picofluor™ 8000-004 handheld fluorometer according to Operating Manual (Part Number 998-0853, Version 1.2, Turner Designs). The fluorometer is used to determine concentrations of unknown samples according to the following optical specifications in Table 1. Once a sample is obtained 2-3 mL of the sample are filtered into a plastic centrifuge tube or straight into the cuvette, allowing the sample to settle (as minute bubbles in the sample will cause reading errors). The cuvette is then inserted into the handheld unit, lid is closed, and a reading obtained. The instrument measures and averages the fluorescence signal over a 5-second interval and results displayed on the fluorometer correspond to the amount of CI in the sample.

TABLE 1

| | Light Source | |
|---|---|---|
| | Blue LED | Green LED |
| Excitation wavelength | 475 ± 15 nm | 525 ± 20 nm |
| Emission wavelength | 515 ± 20 nm | >570 nm |

To gauge the efficacy of the residual product, the following samples were requested prior to and during the trials. The intent of the data collection was to capture the impact that injection rate has on the performance of the fluorescent nanoparticle residual marker. The sampling frequency and volume of collected samples is summarized in Table 2.

TABLE 2

| Trial Phase | Location | Volume | Time Interval |
|---|---|---|---|
| Prior to trial | Inlet | 120 ml | Prior to trial |
| Prior to trial | Water Outlet | 12/120 ml bottles | Prior to trial |
| Prior to trial | Product + Nano Tracer | 120 ml | Prior to trial |
| Prior to trial | System | Temperature, Pressure, pH | 1 time |
| During Trial | Water Outlet | 37/120 ml bottles | 30 min-2 hours |

Samples were taken periodically over the course of a day during Trial 1 until cold temperatures along with water present in the corrosion inhibitor caused the formation of hydrates in the gas lift system. The testing then transitioned to verifying injection rates into the flowline. This change would still generate useful data to differentiate the influence of fluorescent nanoparticles on the process stream from background fluorescence. Injection rates of the traced CI varied between 0 and 1 gallons per day into approximately 1,400 BBL/day water flowrate. This equated to a dosage between 0 to 17 ppm. A minimum of six samples were collected at each flow rate. For Trial 2 injection rates of the traced CI varied between 0 and 3 gallons per day into approximately 2,950 BBL/day water flowrate. This equated to a dosage between 0 to 24 ppm. Samples were collected at each flow rate for the duration of a day until the rate was increased the following morning.

Figure 3:
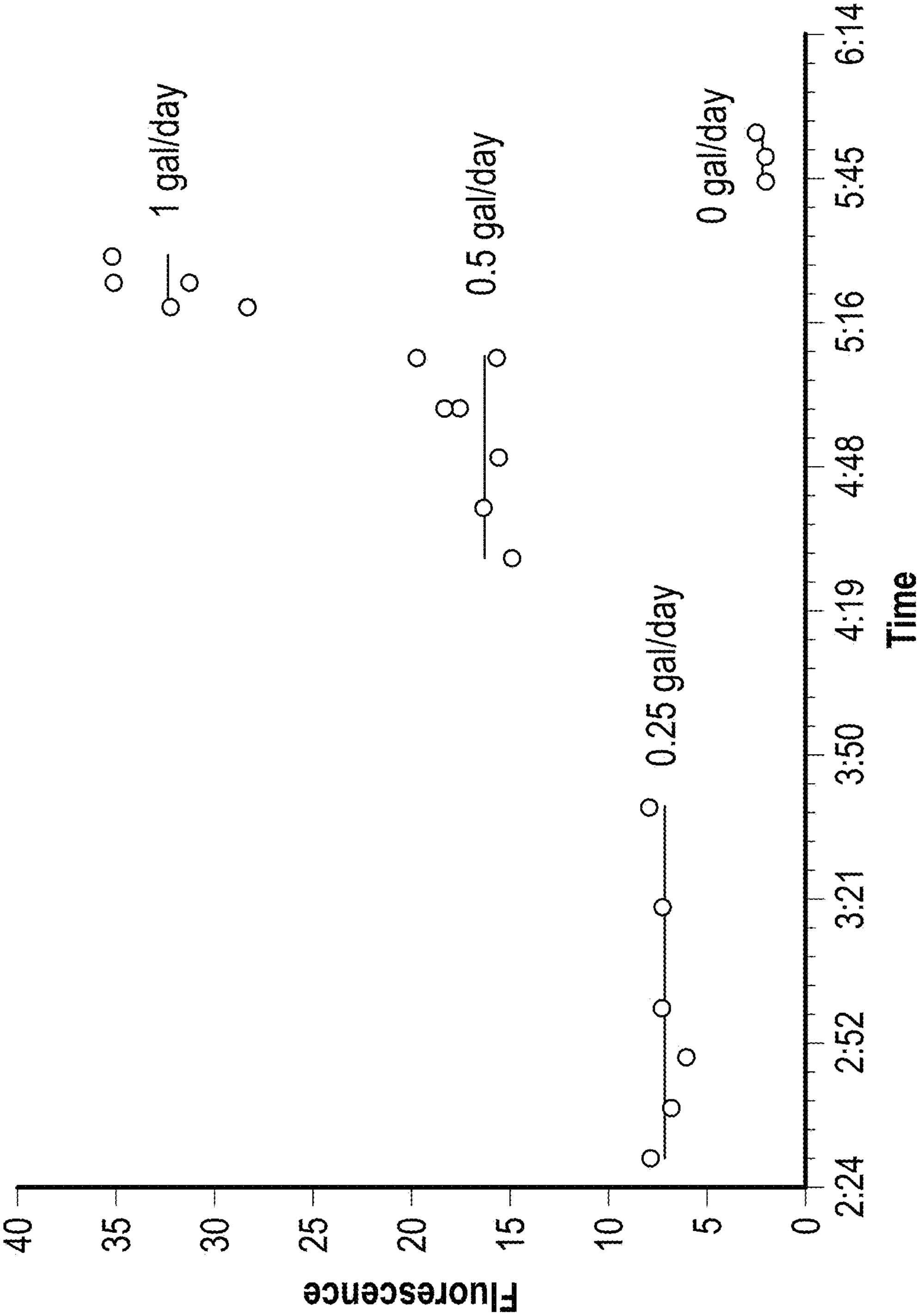
FIG. 3 shows a graph of measured fluorescence per pump injection rate over time at varying injection rates as described in Example 1.

Samples collected from the separator at multiple CI injection rates showed a measurable difference from the background florescence values. A calibration procedure was used to tune the fluorometer to the produced fluids. Using this procedure, an average value of background florescence was determined to be 1.5, as one unit of florescence was calibrated to one ppmV of CI injection using the blank and a 50 ppmV CI standard taken from the stock tank. The pump was then increased to 0.25 gal/day allowing 10-15 mins for the system to reach a new equilibrium before measurements were taken and an average value of 7.13 ppm was recorded. Then increasing to an injection rate of 1 gal/day giving an average fluorescence of 32.6 ppm. Results for measured fluorescence per pump injection rate over time are depicted in FIG. 3. There was more variation in this data with errors greater than 10% from the average at higher injection rates. This demonstrates additional data to correlate results when injection rates increase over a longer time frame.

Figure 4:
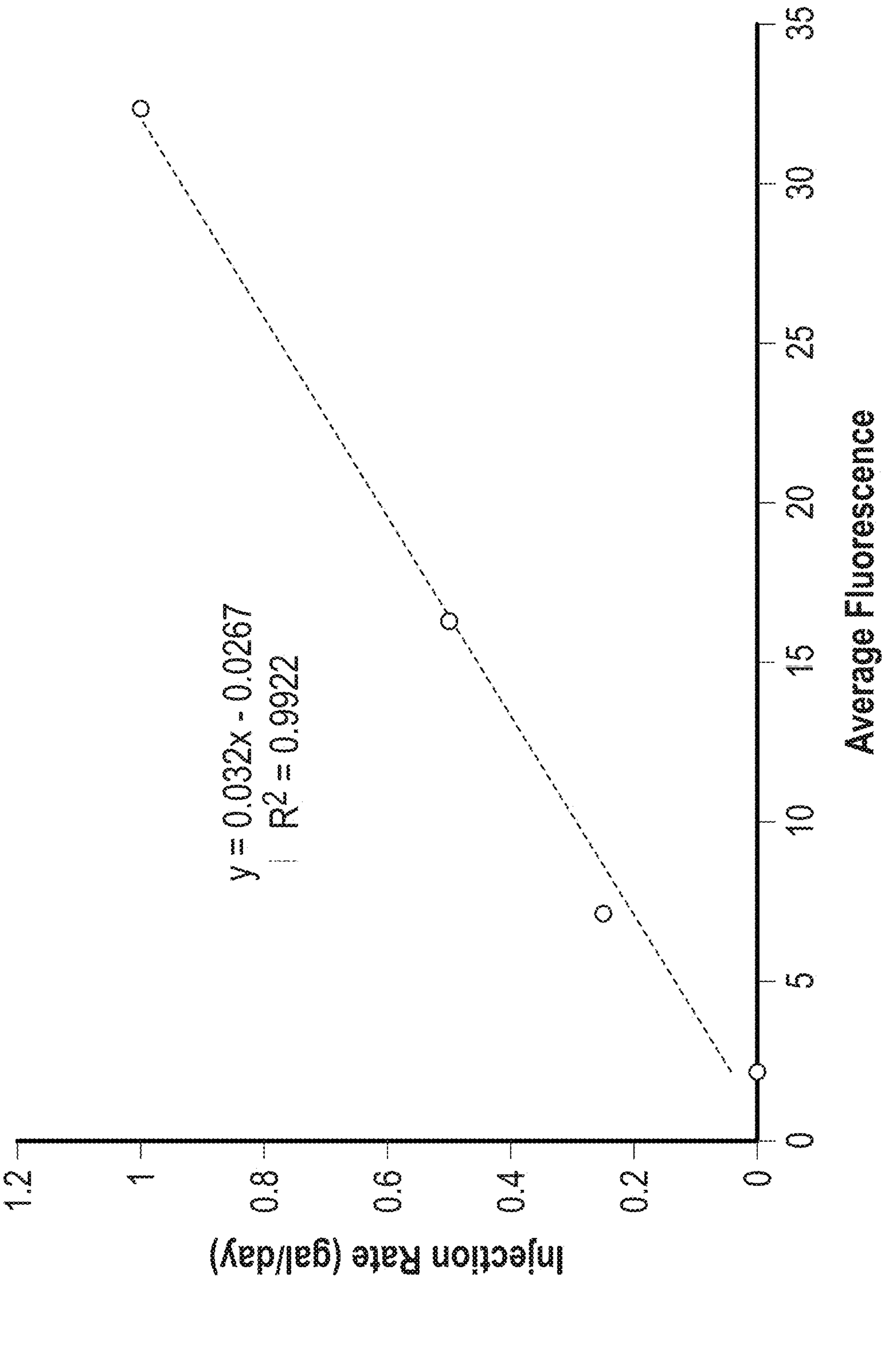
FIG. 4 shows an injection rate pot as a function of measured fluorescence from the handheld meter in Trial 1 as described in Example 1.

To verify the accuracy of fluorescence measurements at different injection rates a linear trend is fitted to the average fluorescence data. The linear regression is used to solve for CI rate as a function of the florescence measured on the handheld meter in the field showing an excellent fit with an $R^2$ value of 0.99 showing that the data fits the regression line well, as depicted in FIG. 4. These results show the field calibration procedure correlates between CI injection rate and measured fluorescence.

Example 2

Figure 5:
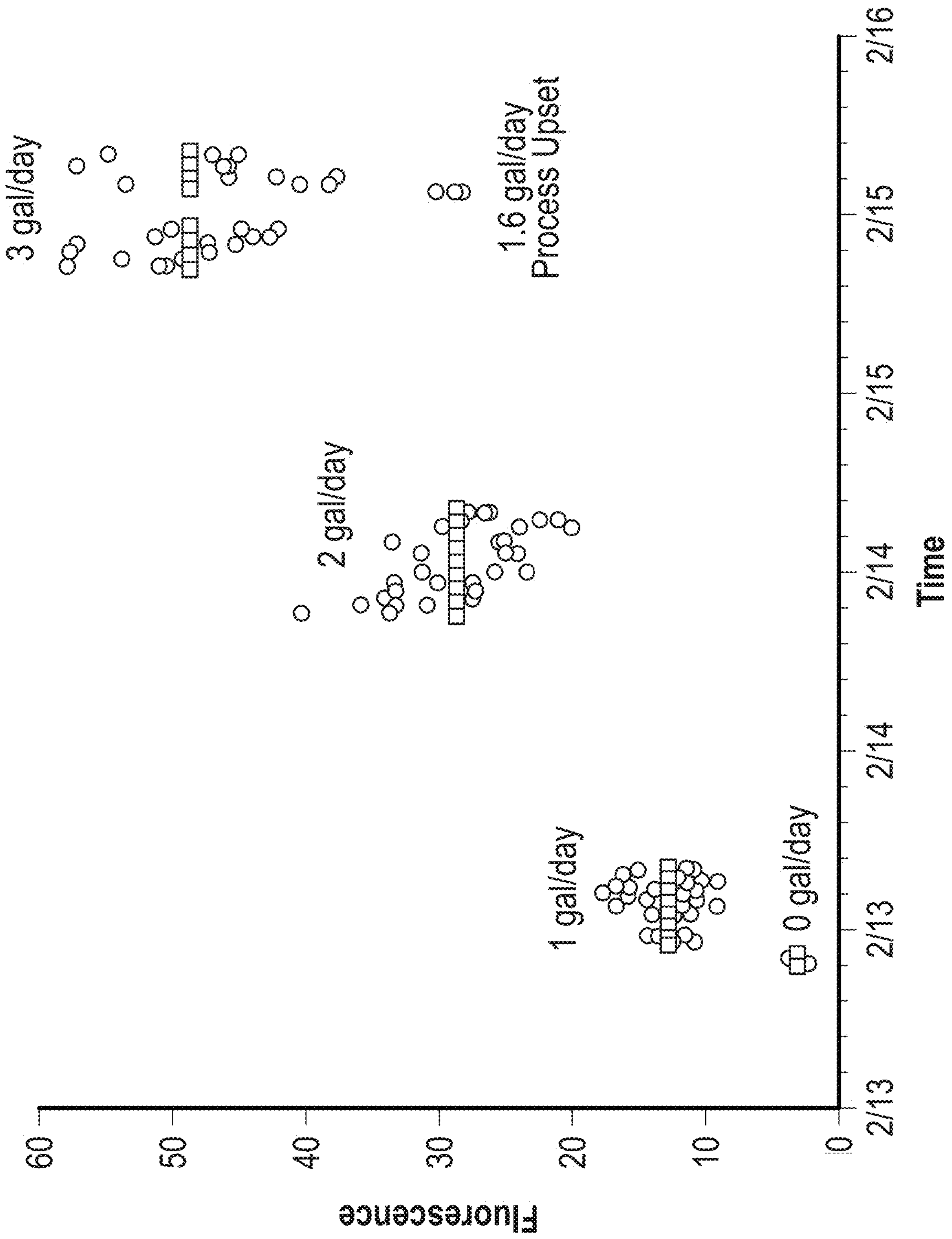
FIG. 5 shows a graph of measured fluorescence per pump injection rate over time at varying injection rates as described in Example 2.

A third trial producing additional data over a longer time using the same sampling techniques as Trial 1 in Example 1 was conducted. Samples were collected once again from the separator at multiple CI injection rates and showed a measurable difference from the background florescence values. Using the same procedure samples now collected from both separators and total fluids line, an average value of background florescence was determined to be 3.1 ppm. The pump was then increased to 1 gal/day for the duration of a day allowing 10-15 mins for the system to reach a new equilibrium before measurements were taken and an average value of 12.8 ppm was recorded. Then increasing to an injection rate of 2 gal/day giving an average fluorescence of 28.7 ppm. The last day of the trial the injection rate was increased to 3 gal/day giving an average florescence value of 48.7 ppm. A trend was also observed that at higher injection rates gave more variation in this data from the average, as shown in FIG. 5.

Figure 6:
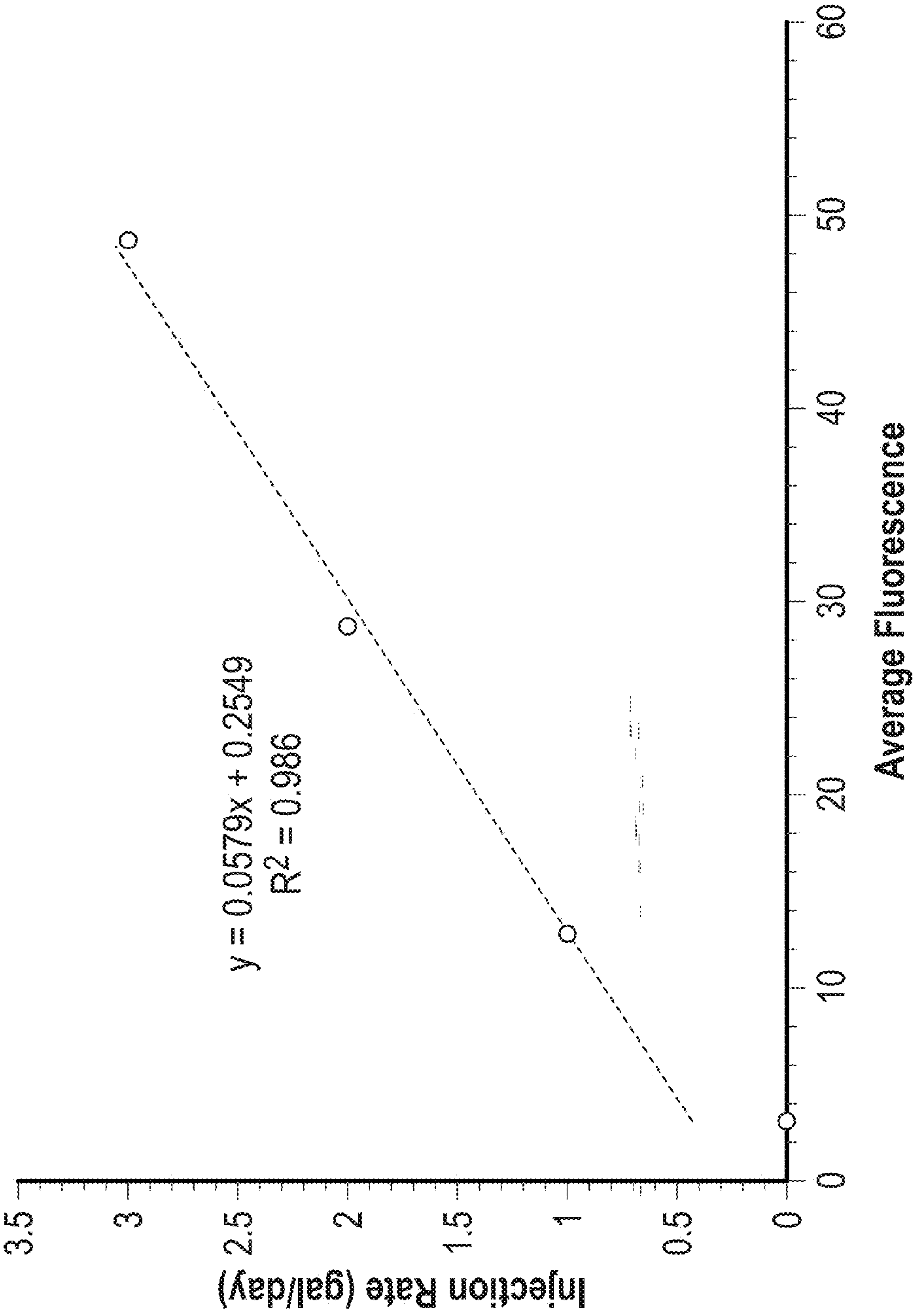
FIG. 6 shows an injection rate pot as a function of measured fluorescence from the handheld meter in Trial 3 as described in Example 2.

To verify the accuracy of fluorescence measurements at different injection rates a linear trend was fitted to the average fluorescence data collected during the trial. The linear regression solved for CI rate as a function of the florescence measured on the handheld fluorometer in the field. This trend showed an excellent fit with an $R^2$ value of 0.98 showing that the data fits the regression line well as shown in FIG. 6.

The use of the same fluorescent nanoparticle (graphene quantum dots, GQD) in the CI provided the ability to quickly and accurately determine CI injection upsets. Many fields utilize pneumatic powered pumps to provide chemical injection due to the lack of electrical power at injection sites. Pneumatic powered pumps carry less accuracy than electric powered pumps as they are subject to changes in pneumatic working pressure and temperature that affect their deliverability. In the Trial 3 testing (FIG. 5) the working pressure of the pump decreased to a predicted rate of 1.6 gal/day, a lower injection rate than expected. The injection rate was predicted, identified easily, and corrected in minutes based on the calibrated response of the GQD demonstrating ability of the compositions and methods to verify chemical injection quickly and modify CI injection and/or dosing rates to achieve desired outcomes of the CI (or other oilfield chemicals).

Example 3

Further data was collected using the same sampling techniques as Trial 1 in Example 1. The field conditions included a single well to separator with 99% water cut. There was no chemical injection prior to the trial. The trial was conducted with a CI (6.5% imidazoline, 6.5% quaternary ammonium compounds, about 2.5% mercaptoethanol and the remainder water) with 1% fluorescent nanoparticle—graphene quantum dot (GQD)—injected at varied rates providing approximately 300 ppm GQD in the product. The GQD was commercially purchased containing approximately 3% GQD in methanol.

Figure 7:
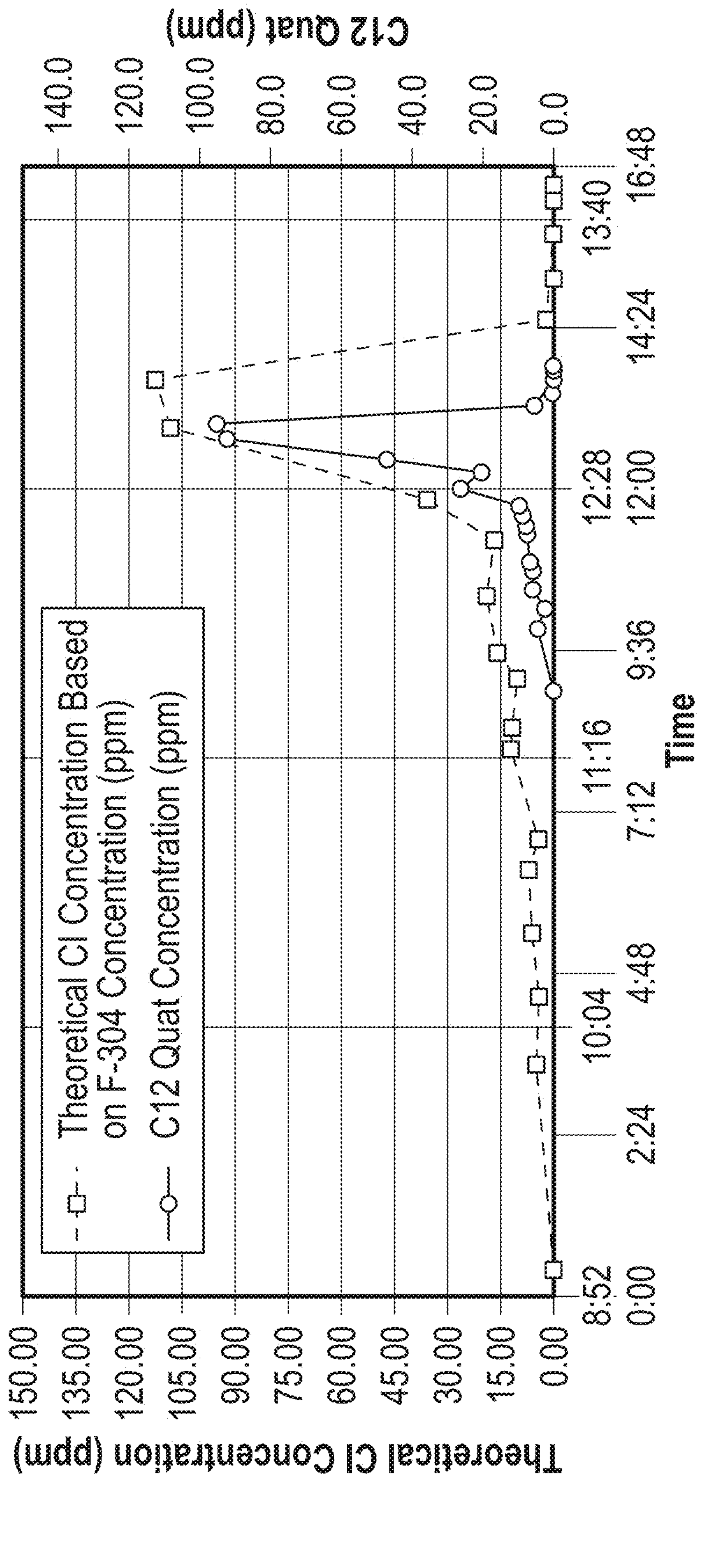
FIG. 7 shows a graph comparing CI concentration based on the GQD on y-axis (left) compared to measured CI quat (ppm) from LC-MS technique on y-axis (right) over time as described in Example 3.

The GQD was calibrated between 0.01-0.1 ppm in brine with 1-10 ppm quat CI chemistry. Samples were analyzed over a few hours' time in a single day and measurements plotted against the quat CI data with theoretical CI concentration as shown in FIG. 7. The dark line/data points show the theoretical CI concentration based on the GQD concentration (ppm) and the light line/data points shows the measured CI quat concentration. As depicted in the figure the use of the fluorescent nanoparticles (GQD in this Example) provides an accurate measurement of the treatment compound (quat CI in this Example) confirming utility and accuracy of the described compositions and methods. The results show that a real time measurement as completed in this field trial provide accurate measurement of the CI providing a real time, in the field fluorescent measurement, that provides more specific and precise feedback on application rates and product residual instead of relying on laboratory measurements with delayed ability to modify dosing of the CI. Beneficially, these methods would provide a technician in the field to apply prompt application rate modifications based on the field fluorescence measurements.

Example 4

Further data was collected at an offshore field trial location using the same sampling techniques as Trial 1 in Example 1. The field conditions included multiple wells co-mingled into one line and having about 10-40% water cut ranges. The trial was conducted with a CI (7% imidazoline, 15.5% quaternary ammonium compounds, 5% phosphate ester, and about 5% mercaptoethanol, 1.75% ethoxylated nonylphenol surfactant, 1.5% diethanolamine, 3.5% anti-emulsifier with the balance being methanol) with 1% fluorescent nanoparticle tracer—graphene quantum dot (GQD)—injected to provide approximately 300 ppm GQD in the product (1% fluorescent nanoparticle tracer added to the CI that included approximately 3% GQD in methanol). The GQD was commercially purchased containing approximately 3% GQD in methanol.

A calibration curve was prepared in the water/brine phase by diluting the CI-GQD sample in an appropriate solvent to various predetermined concentrations from 0 to 1,000 ppm. A sample of each is filtered and centrifuged. The fluorescence is measured for a sample with no CI (but containing GQD). This measurement is considered the background or "zero" measurement. The fluorescence of the other samples with known concentrations of CI-GQD were measured. This data was used to generate a calibration curve.

Figure 8:
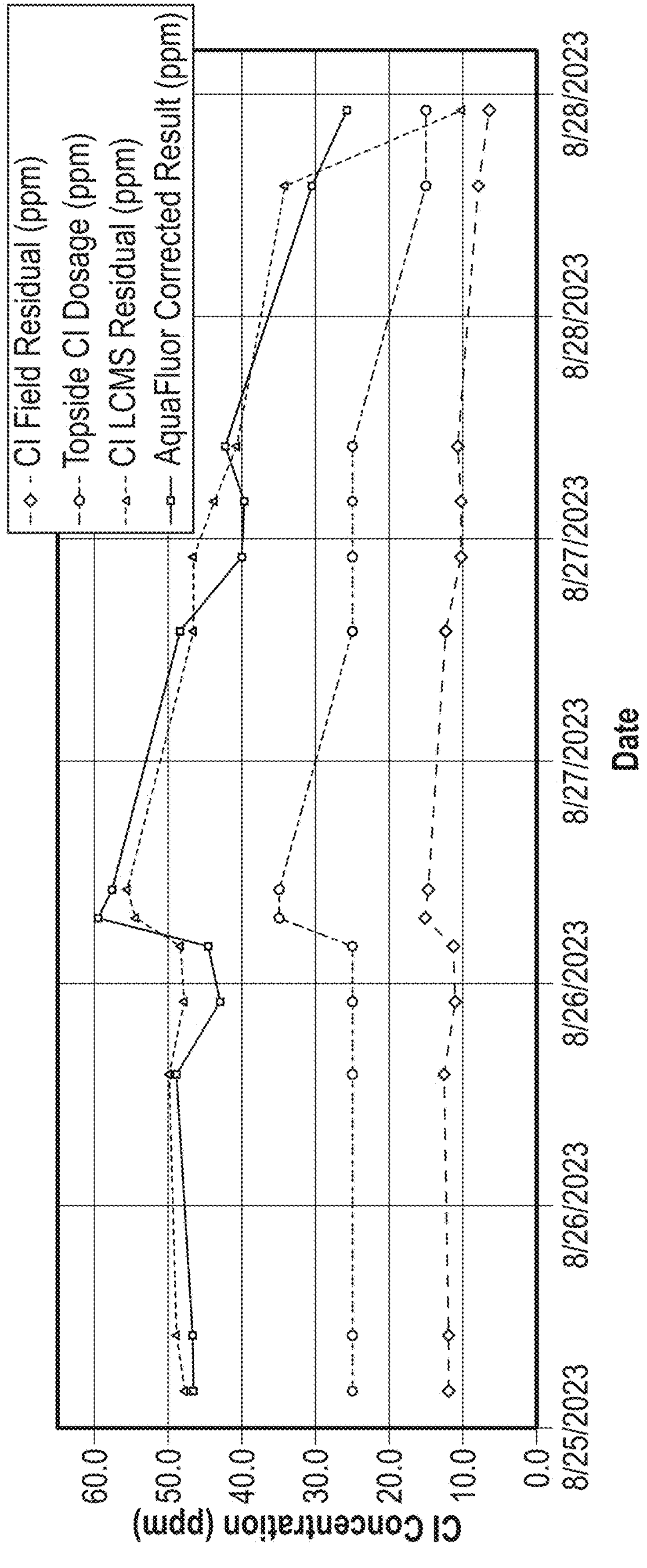
FIG. 8 shows a graph comparing CI concentration based on the GQD on y-axis compared to measured CI quat (ppm) from LC-MS technique on y-axis over time as described in Example 4.

Water samples were taken and analyzed in the field using an AquaFluor Handheld Spectrofluorometer. The water sample was taken and fluorescence measured at λEx=490 nm and λEm=515 nm. The results are shown in FIG. 8. Topside CI Dosage denotes the actual injection of the CI based on the total fluids (oil and water). As shown in FIG. 8, the first dose rate was about 25 ppm on total fluids. With a 20% water cut, if there was 100% water partitioning (i.e. all the CI went to the water phase), then the theoretical amount of CI in the water would be 125 ppm. With a 40% partitioning, which is common in the field, that would equate to about 50 ppm CI in the water which correlates to the CI LCMS Residual measurements in FIG. 8. The CI LCMS Residual data is the actual CI measured using standard laboratory LC-MS technique. In FIG. 8, the direct fluorescent measurement of the GOD is labeled as CI Field Residual. The correlation factor determined from the calibration curve was imparted on this measured data and is labeled AquaFluor Corrected Result. The corrected data overlays with the LCMS data. The results show that a real time measurement as completed in this field trial provide accurate measurement of the CI providing a real time, in the field fluorescent measurement, that provides more specific and precise feedback on application rates and product residual instead of relying on laboratory measurements with delayed ability to modify dosing of the CI.

Example 5

A calibration curve was prepared for the fluorescing nanoparticle Red Fluorescent Silica Nanoparticle (RFSN) from CD Bioparticles. The RFSN has a diameter of about 200 nm and is a 5% solution (50 mg/ml water). 2% of the RFSN was added to a CI comprising about 6.5% quaternary ammonium compound, 6.5% imidazoline, about 2.5% mercaptoethanol, and the balance being water, equating to a solution with about 0.1% RFSN.

A calibration curve was constructed by dosing various amounts of the CI-RFSN in 1% NaCl brine and measuring the fluorescence of the RFSN with a Shimadzu RF-5301 Fluorescence Spectrophotometer, consistent with the method described in Example 4. Fluorescence was measured at λEx=569 nm and λEm=585 nm.

Figure 9:
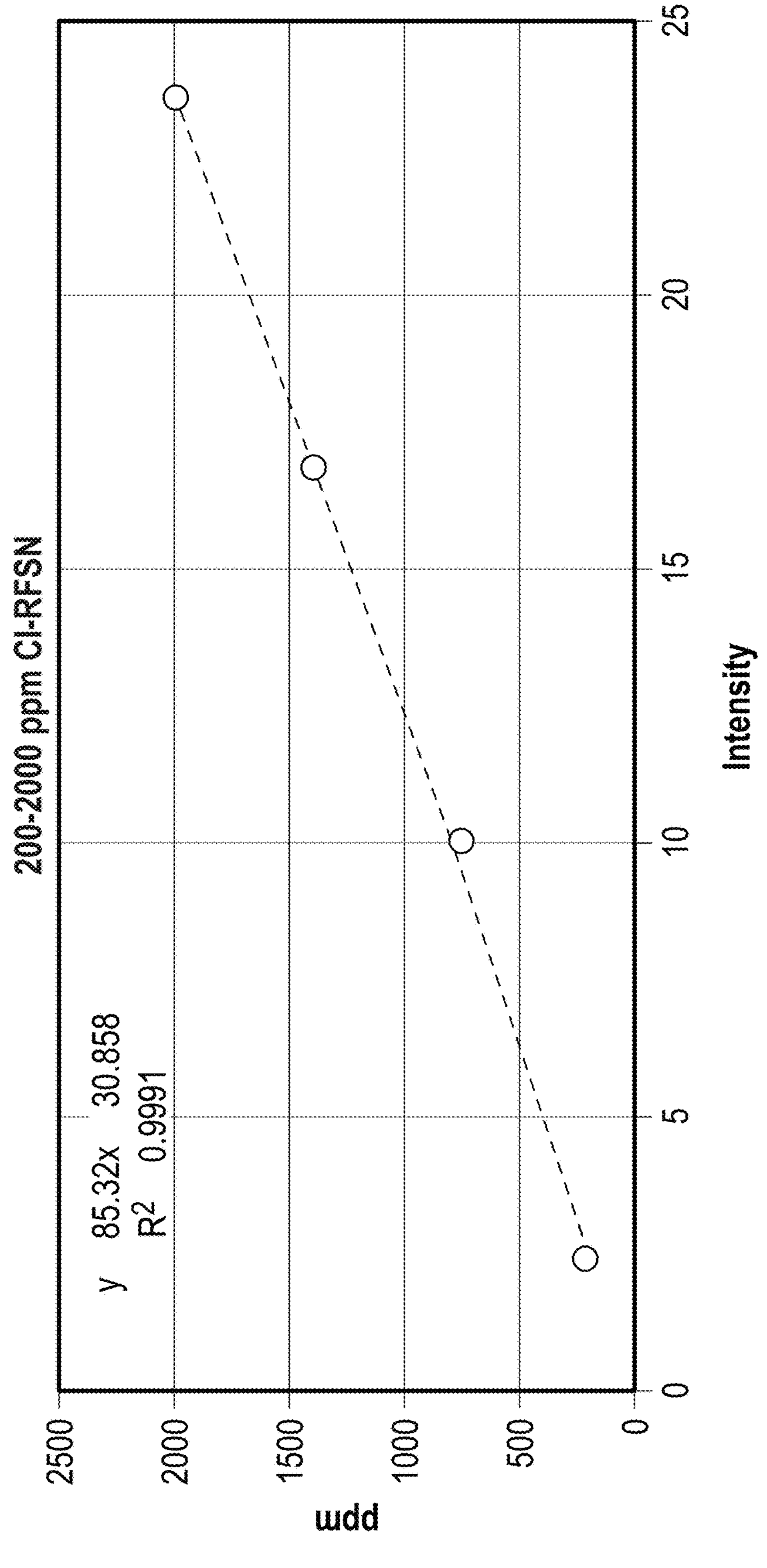
FIG. 9 shows the calibration curve for 200 ppm to 2000 ppm of CI-RFSN as described in Example 5.
Figure 10:
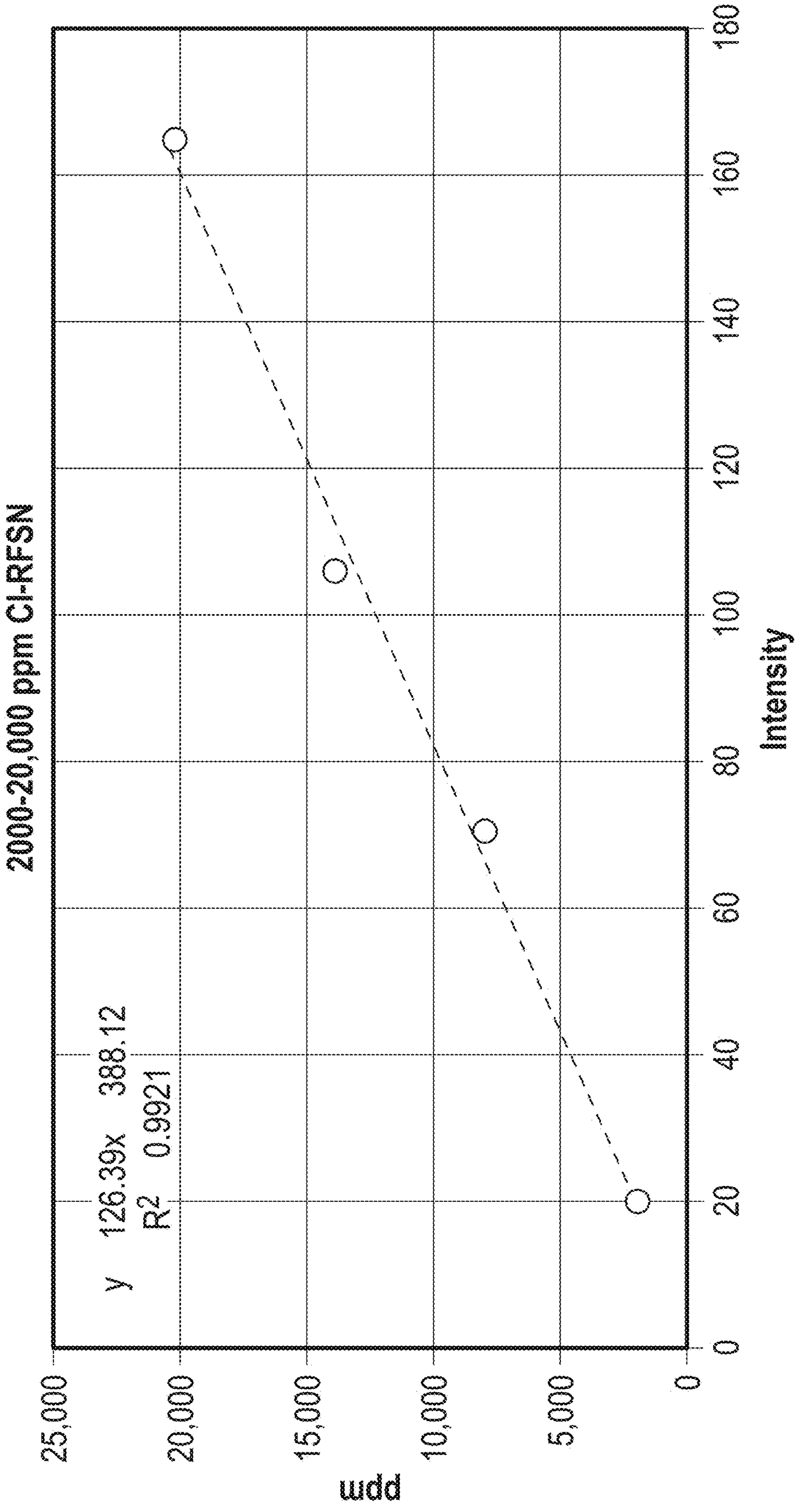
FIG. 10 shows the calibration curve for 2000 ppm to 20,000 ppm of CI-RFSN as described in Example 5.

The calibration curve for 200 ppm to 2000 ppm CI-RFSN is shown in FIG. 9 and the calibration curve for 2000 ppm to 20,000 ppm CI-RFSN is shown in FIG. 10. The results show that a calibration curve can be utilized for accurate real time measurement of the CI (as well as other treatment compounds) for multiple fluorescents.

Example 6

A calibration curve was prepared for a fluorescing polystyrene nanoparticle (PSNP) from CD Bioparticles. This polystyrene nanoparticle is red with a 200 nm diameter and is a 1% solution in DI water with about 2 mM sodium azide as an anti-microbial agent. 3% of the PSNP was added to a CI comprising about 6.5% quaternary ammonium compound, 6.5% imidazoline, and about 2.5% mercaptoethanol, with the balance being water. This equated to a solution with about 0.03% of the PSNP.

A calibration curve was construction by dosing various amounts of CI-PSNP in 1% NaCl brine and measure the fluorescence with a Shimadzu RF-6000 Fluorescence Spectrophotometer, consistent with the method described in Example 4. Fluorescence was measured at λEx=545 nm and λEm=566 nm.

Figure 11:
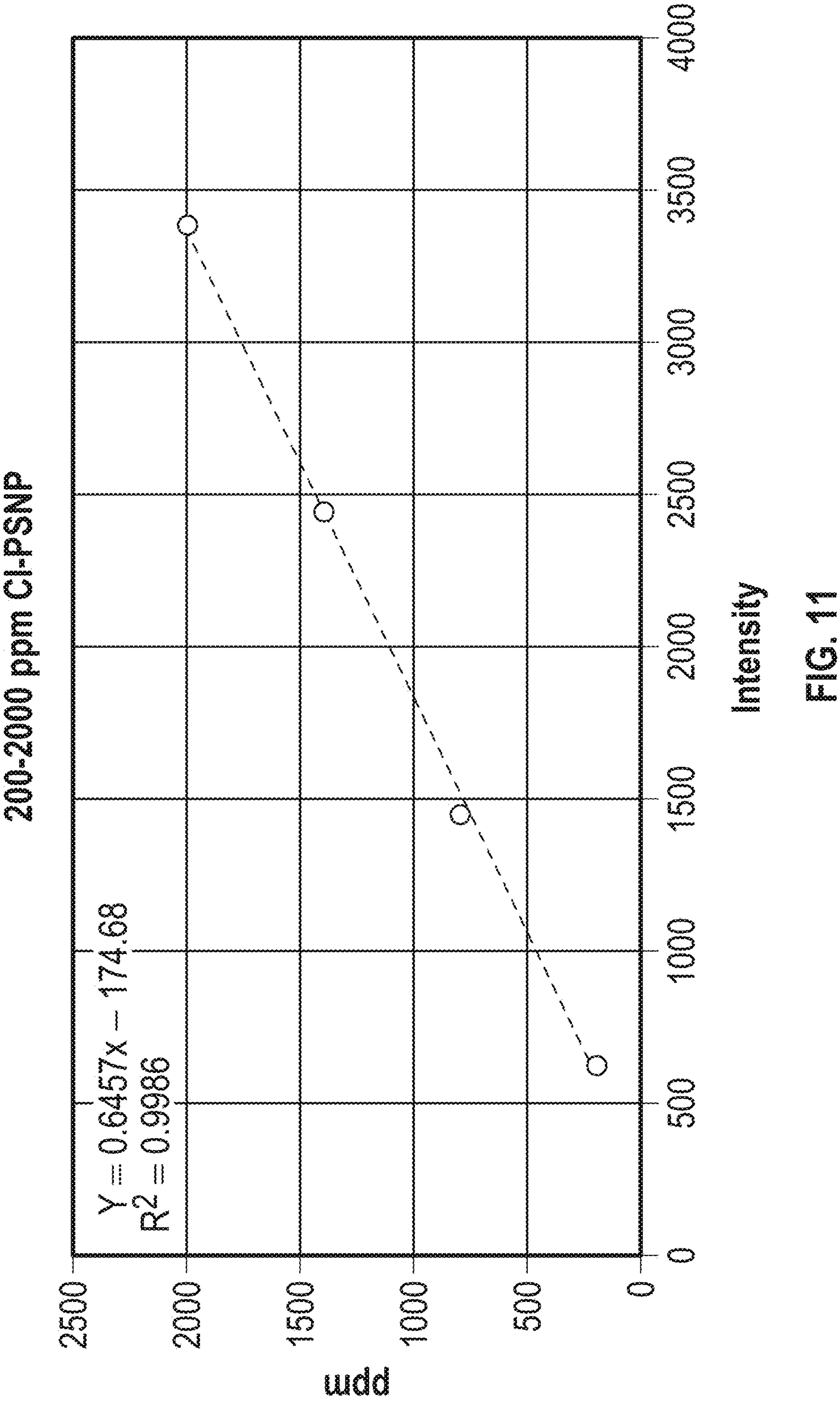
FIG. 11 shows the calibration curve for 200 ppm to 2000 ppm of CI-PSNP as described in Example 6.

The calibration curve for 200 ppm to 2000 ppm CI-PSNP is shown in FIG. 11. The results show that a calibration curve can be utilized for accurate real time measurement of the CI (as well as other treatment compounds) for multiple fluorescents.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. Any reference to accompanying drawings which form a part hereof, are shown, by way of illustration only. It is understood that other embodiments may be utilized, and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A fluorescent treatment composition comprising:

from about 0.0001-5 wt % of a fluorescent nanoparticle comprising at least one of graphene quantum dots, carbon dots, carbonaceous nanomaterials, upconversion nanoparticles, noble metal nanoparticles, sol-gels, hydrophilic polymers, hydrogels, hydrophobic organic polymers, semiconducting polymer dots, dendrimers, silica nanoparticles, and doped and undoped nanoparticles with organic, metal-organic and metallic fluorophores; and a treatment compound comprising an oilfield chemical, water treatment chemical, geothermal chemical, chemicals in gas, liquid and/or supercritical fluids lines and systems, or combinations thereof, wherein the composition luminesces at a determined wavelength between about 300 nm to about 1,000 nm when excited by light having a wavelength determined by the fluorescent nanoparticle and wherein the fluorescent nanoparticle is not functionalized and/or covalently bonded to the treatment compound.

2. The composition of claim 1, further comprising an additive and/or adjuvant, wherein the additive and/or adjuvant is a solvent comprising from about 0.1 wt % to about 90 wt % of the composition.

3. The composition of claim 1, wherein the oilfield chemical is selected from the group consisting of a corrosion inhibitor, biocide, scale inhibitor, hydrate inhibitor, paraffin inhibitor, asphaltene inhibitor, demulsifier, and foamer.

4. The composition of claim 1, wherein the ratio of the fluorescent nanoparticle to the oilfield chemical(s) is about 1:10 to about $1:1\times10^{11}$ by weight, and wherein the oilfield chemical(s) comprises from about 0.01 wt % to about 99.9 wt % of the composition.

5. The composition of claim 1, wherein the composition luminesces at a wavelength of about 600 nm to 700 nm when excited by light having a wavelength of about 500 nm.

6. The composition of claim 1, wherein the fluorescent nanoparticle is a graphene quantum dot that is not functionalized and/or covalently bonded to the oilfield chemical(s), and wherein the graphene quantum dot has a particle size from about 1 nm to 20 nm.

* * * * *